United States Patent Office 3,191,357
Patented June 29, 1965

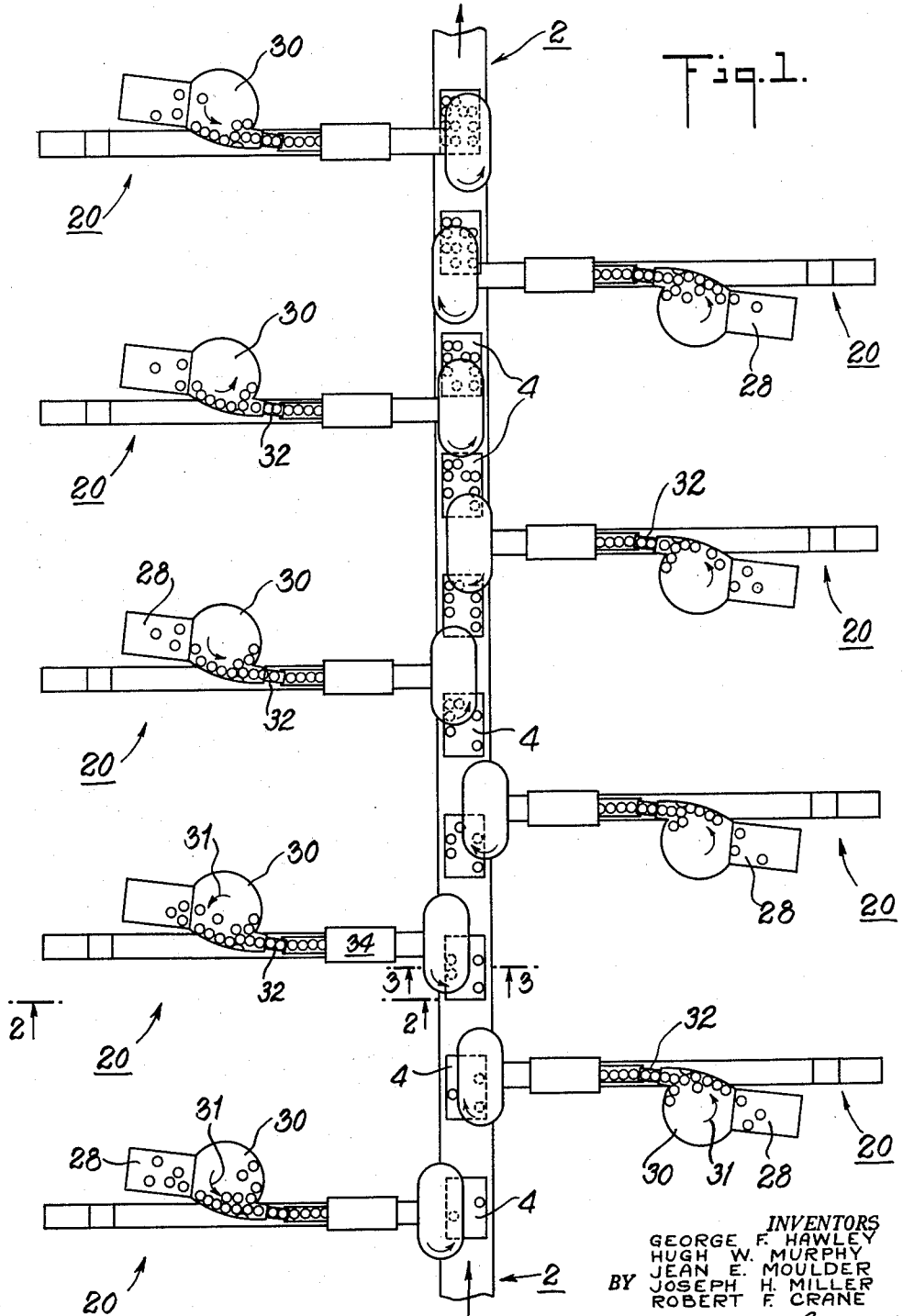

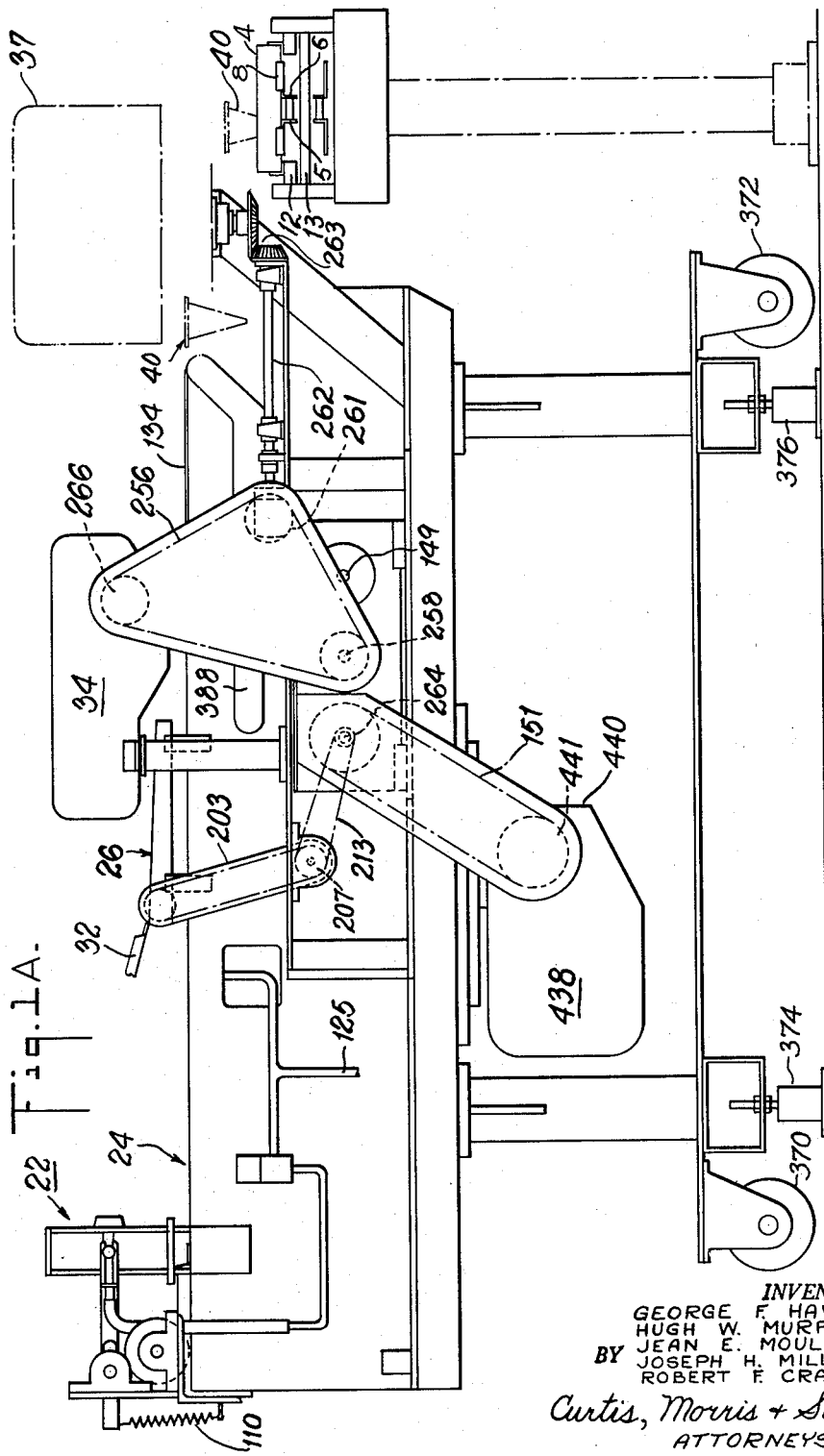

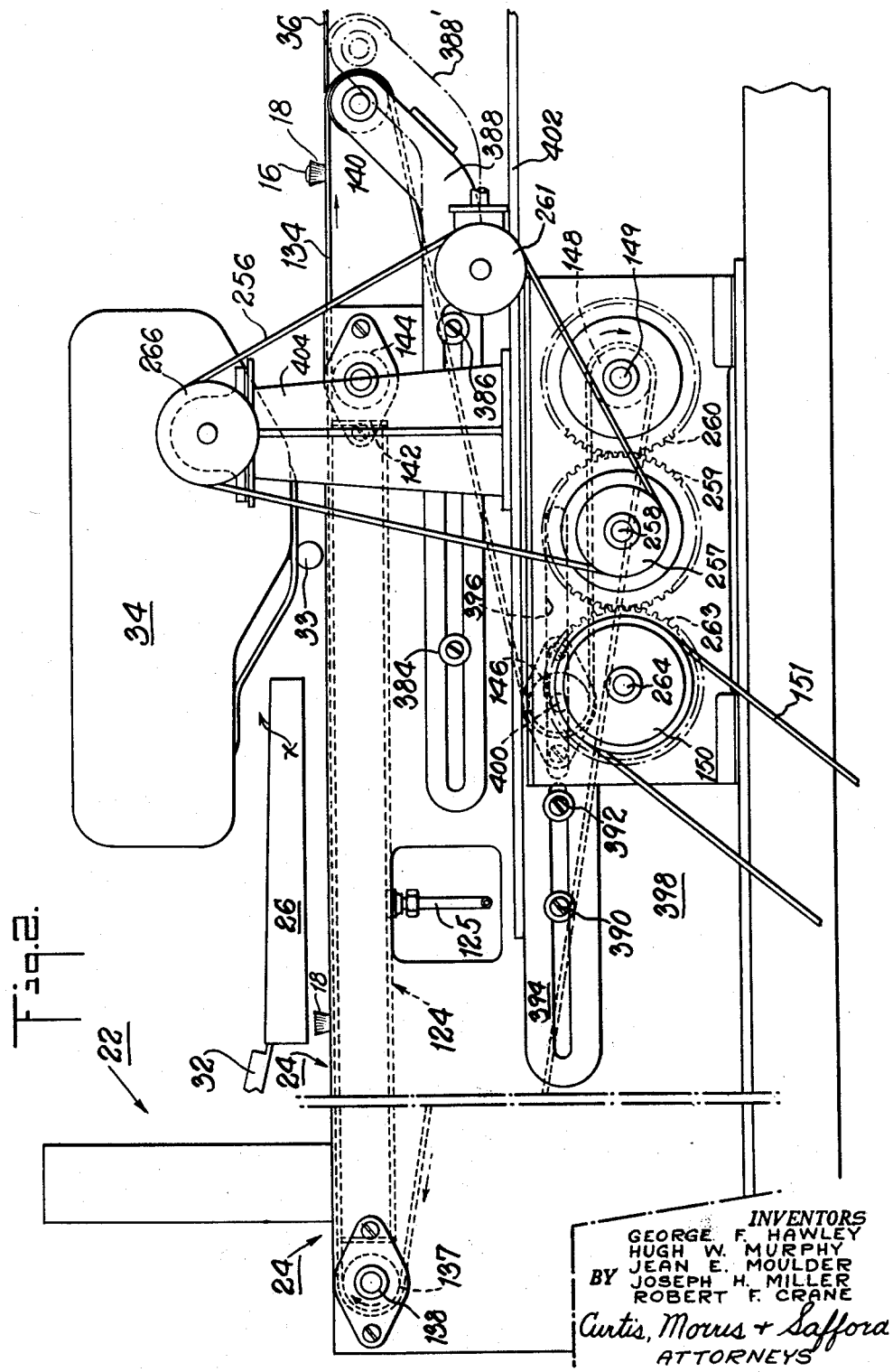

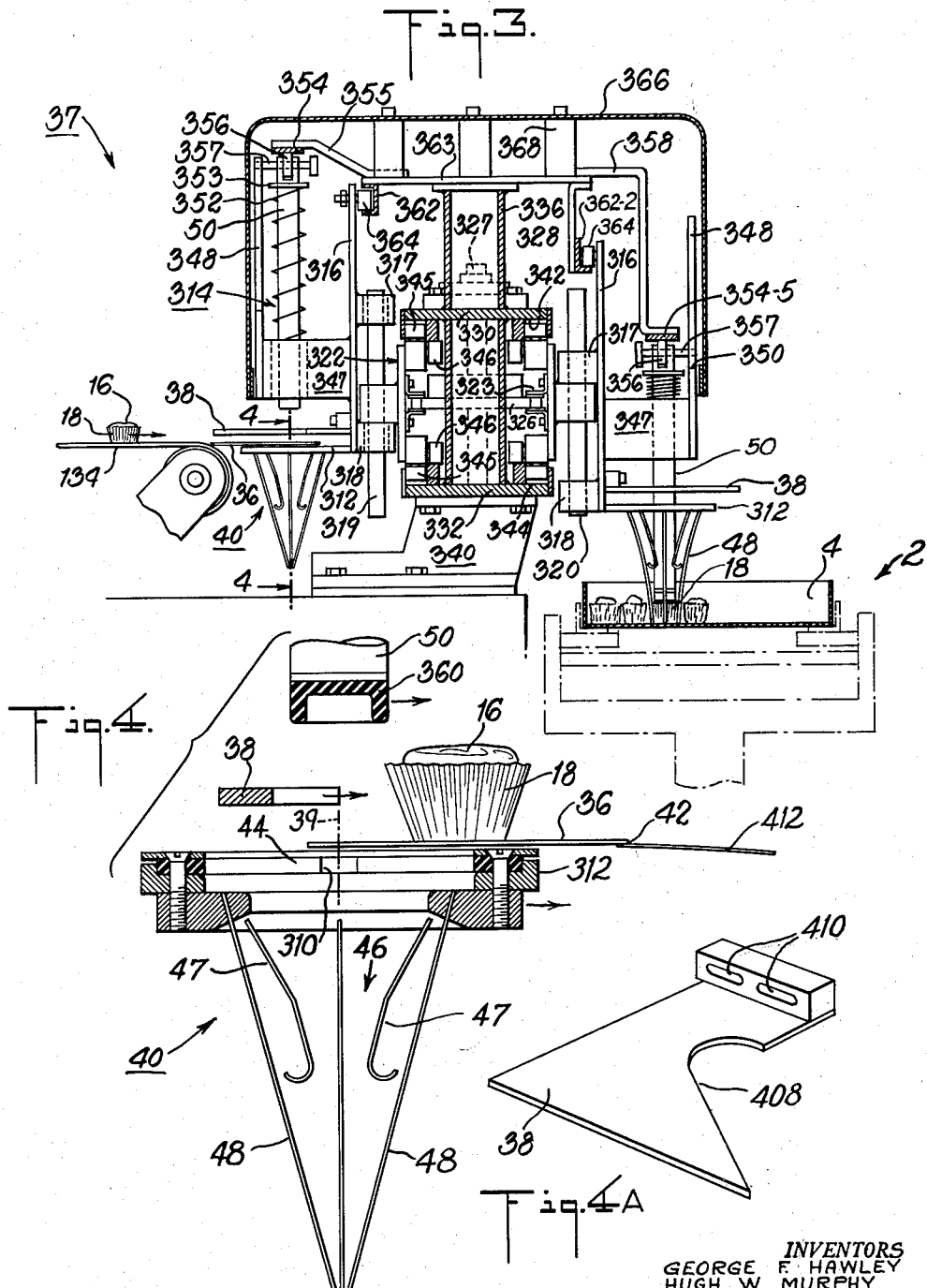

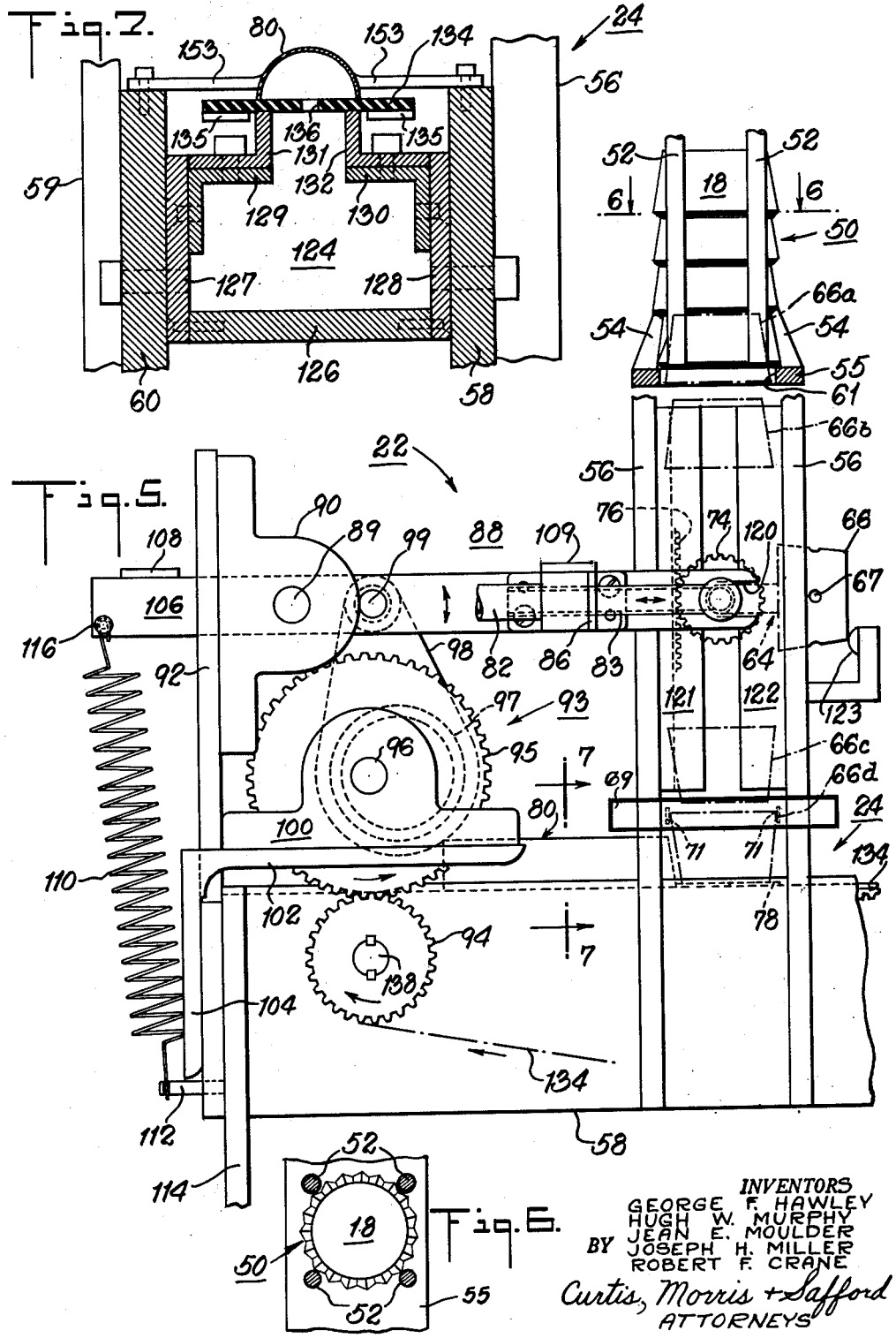

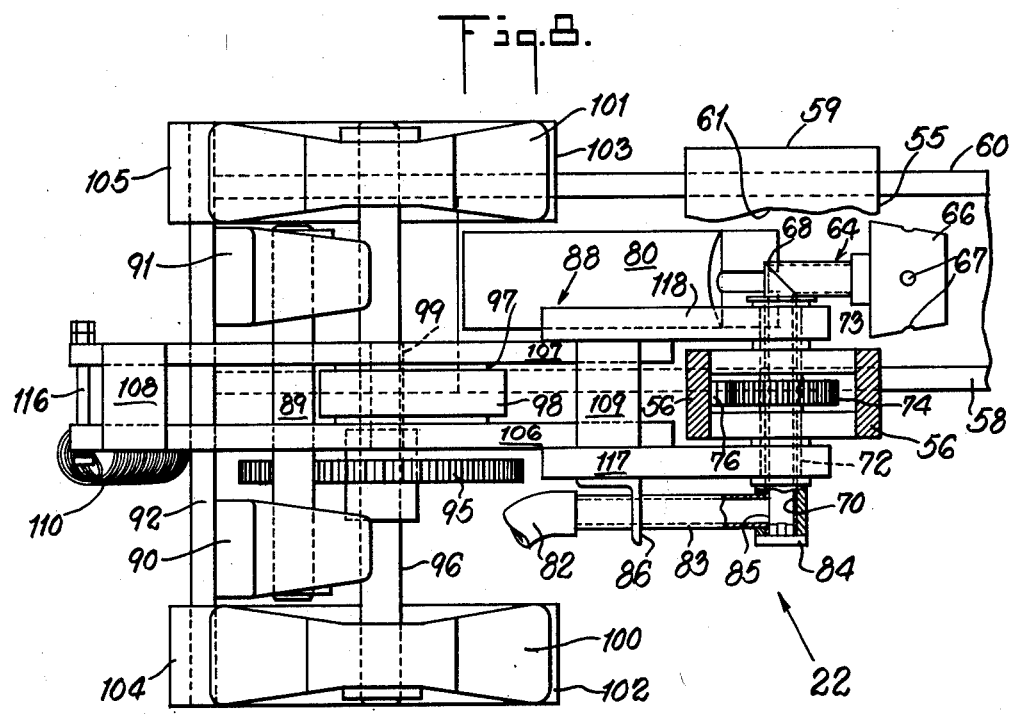
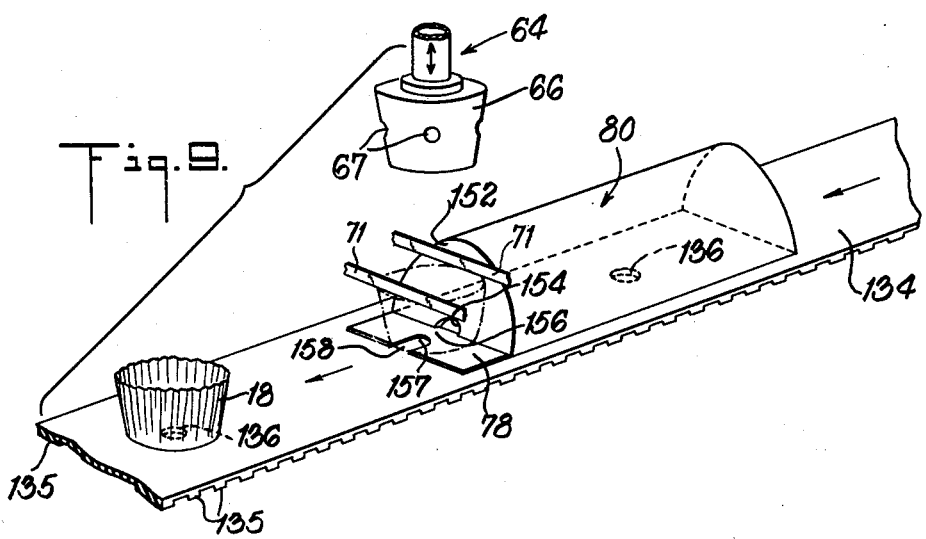

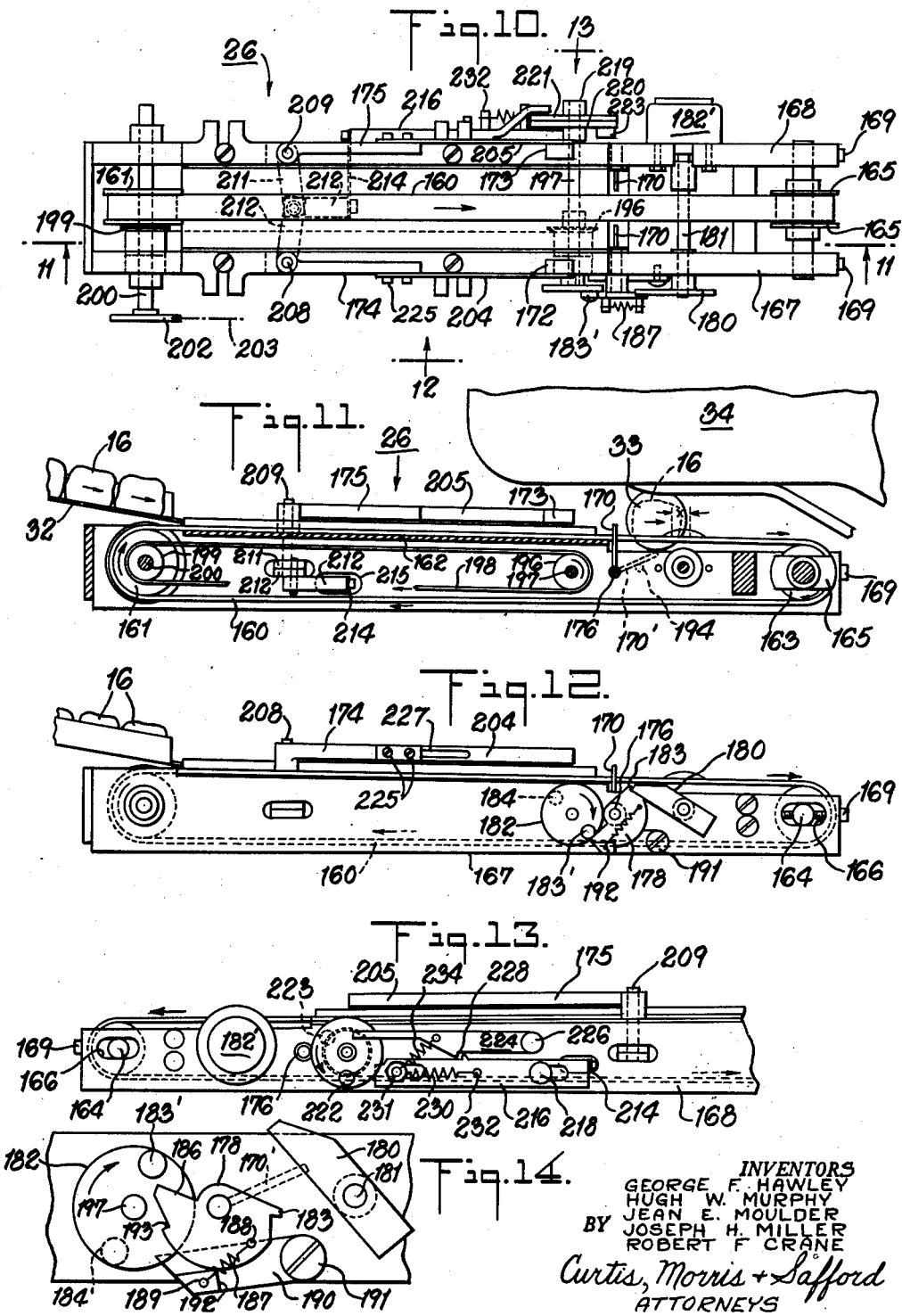

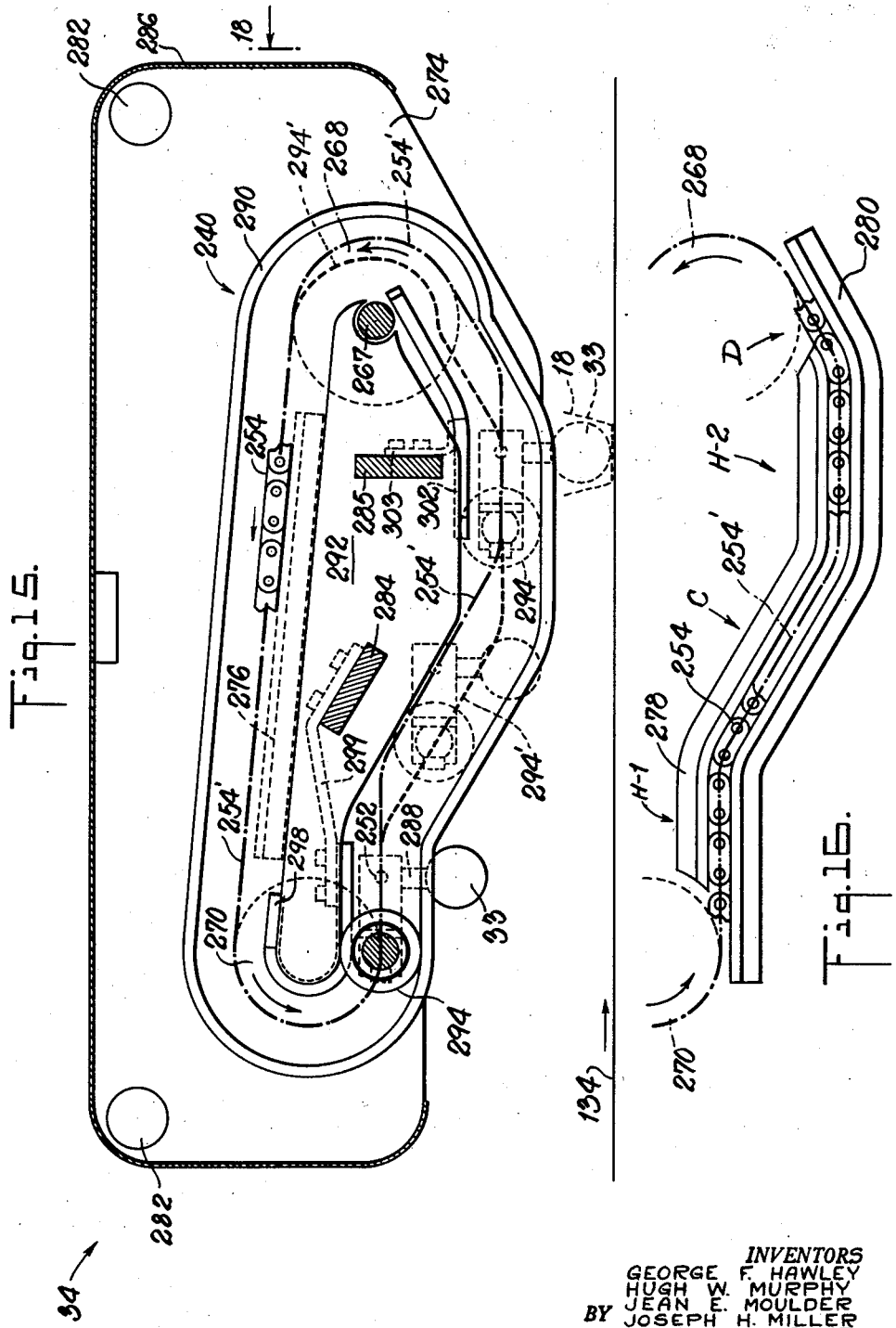

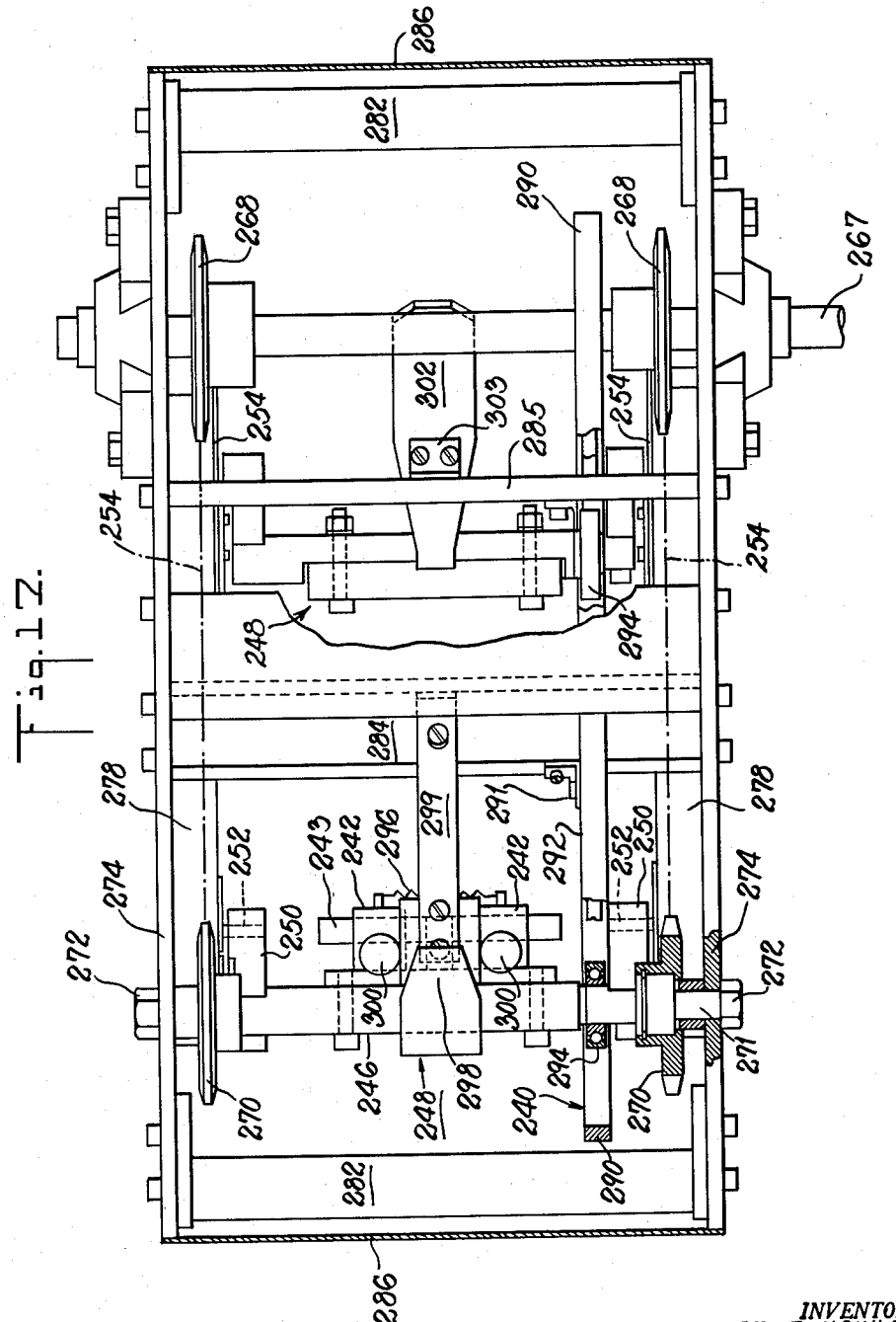

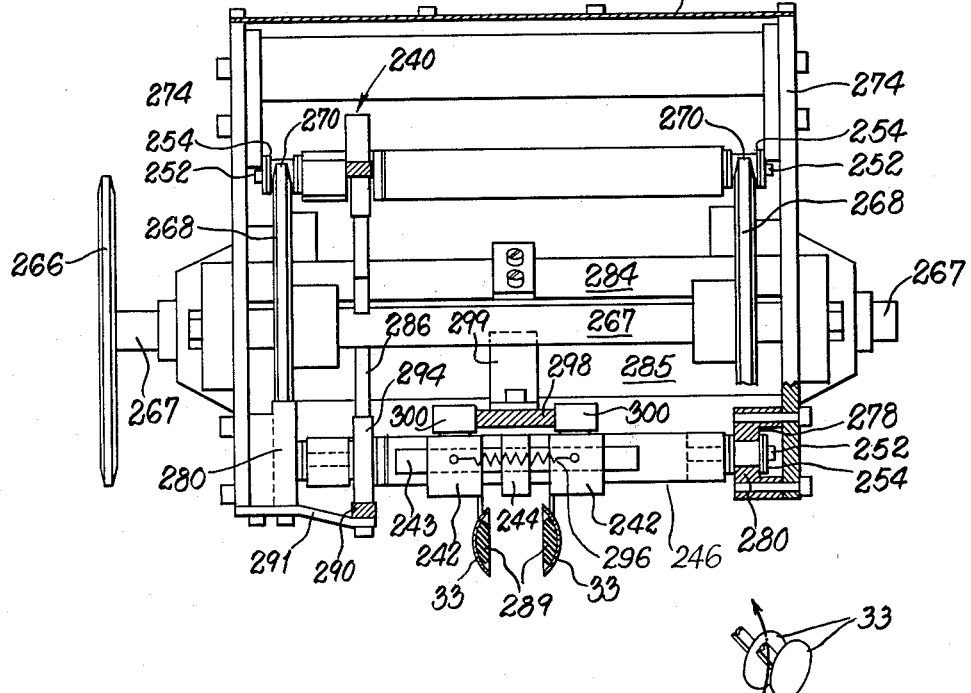
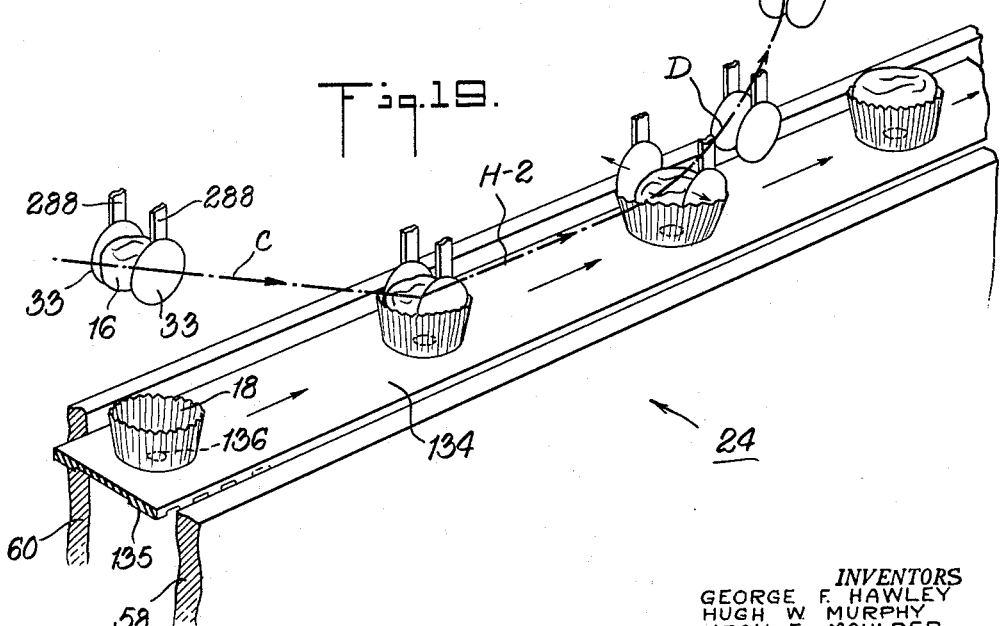

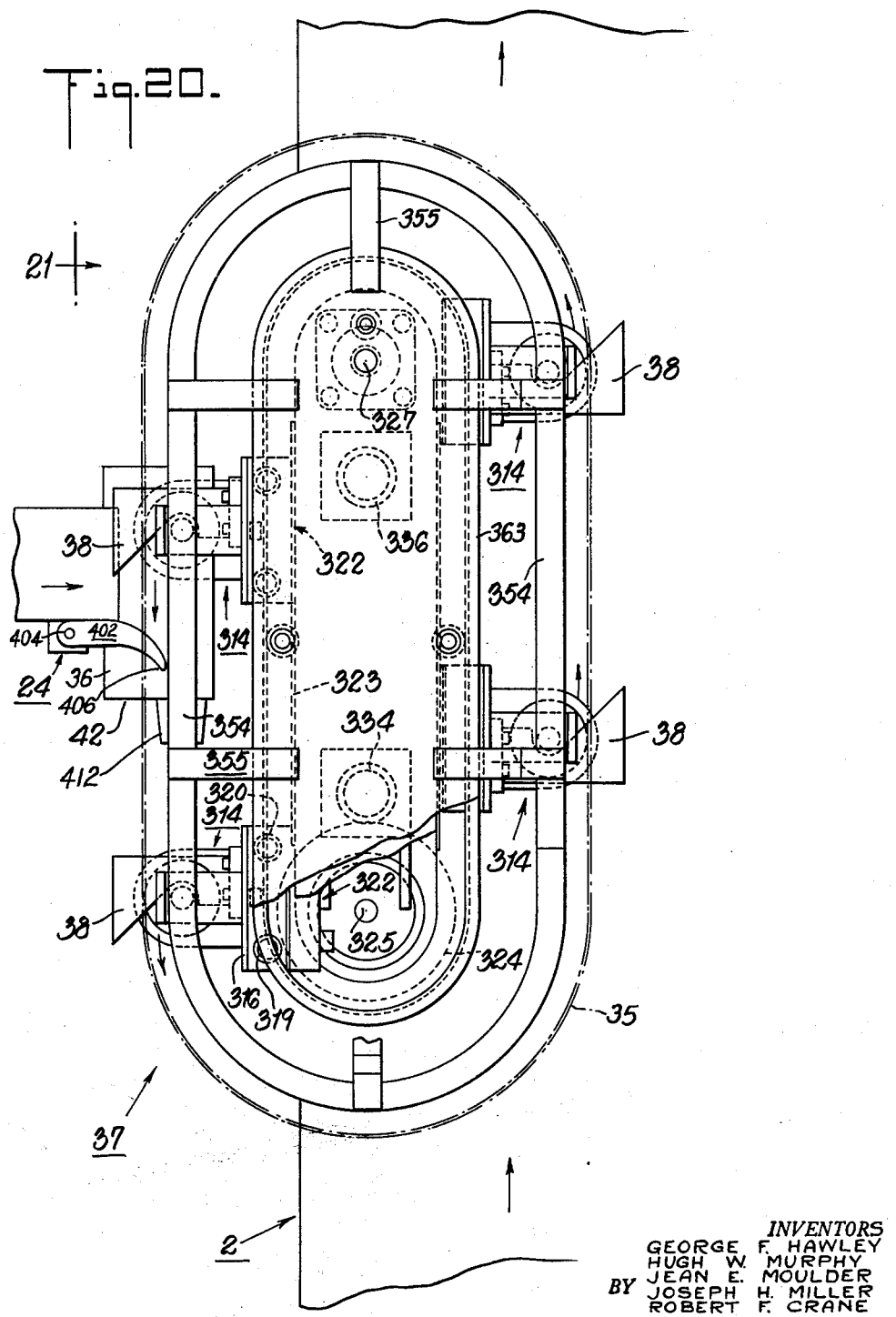

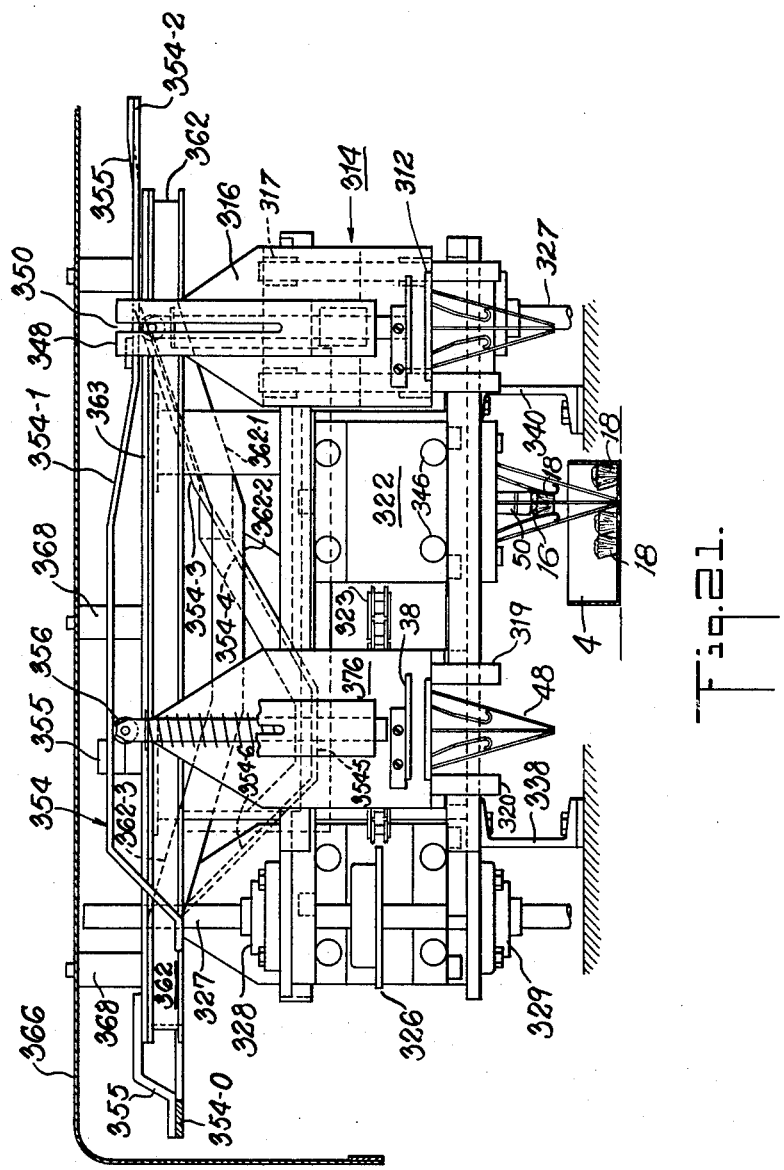

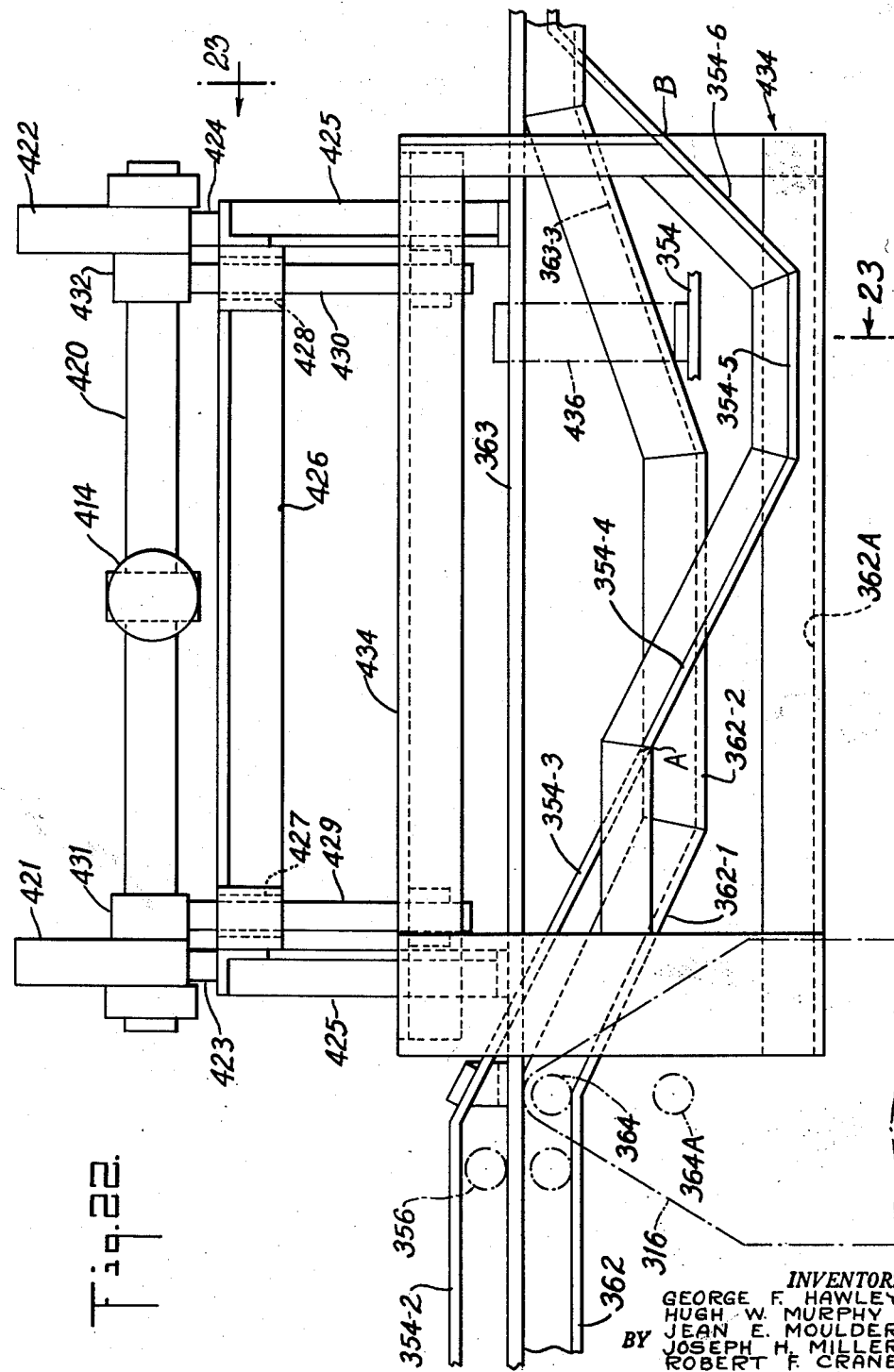

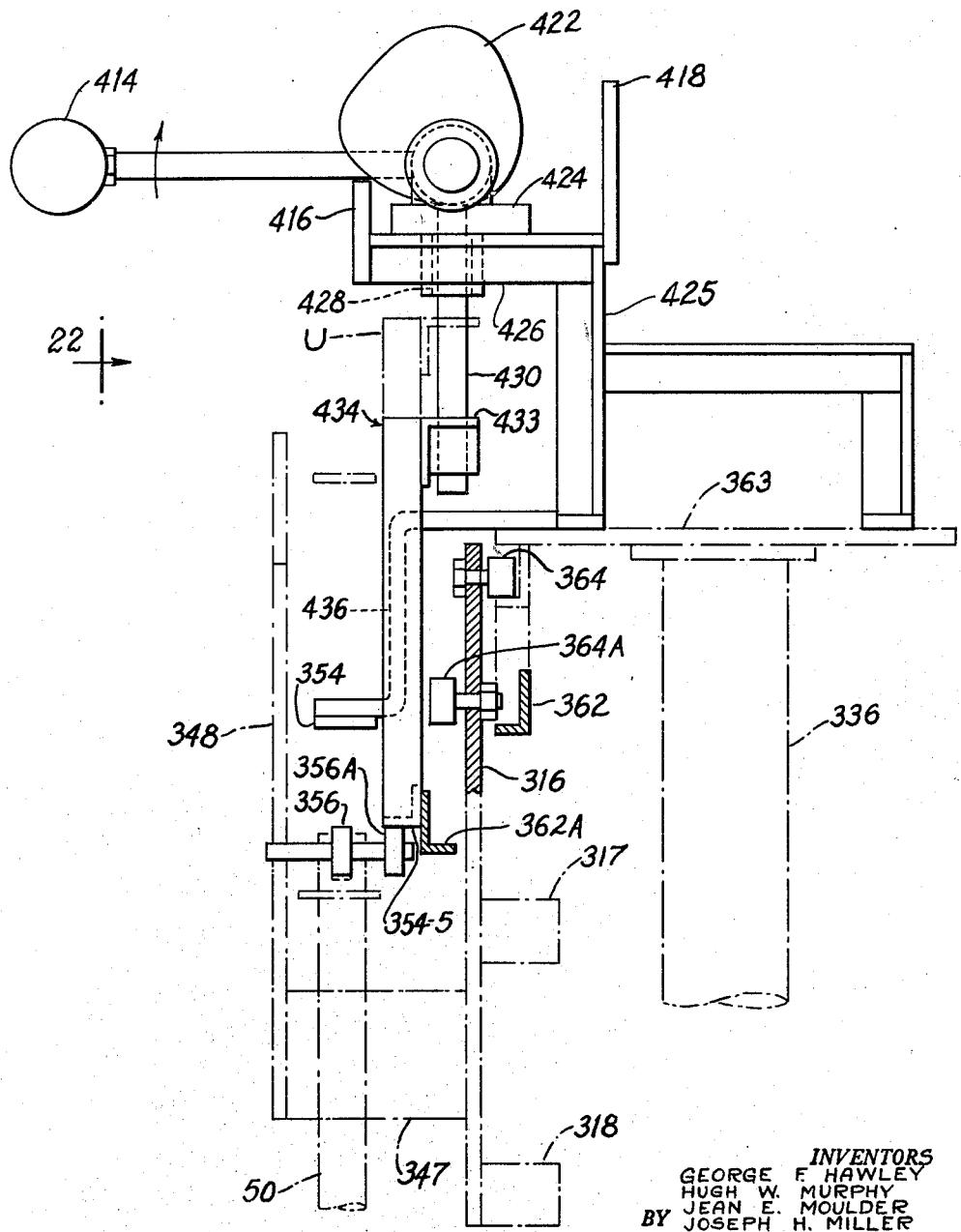

3,191,357
APPARATUS FOR PACKAGING CONFECTIONS
George F. Hawley, Bogota, N.J., Hugh W. Murphy, Saratoga, Calif., Jean E. Moulder, Hartsdale, N.Y., Joseph H. Miller, Old Greenwich, Conn., and Robert F. Crane, Scarsdale, N.Y., assignors to AEL Food Machinery Division, Inc., Stamford, Conn.
Filed June 24, 1960, Ser. No. 38,543
27 Claims. (Cl. 53—240)

This invention relates to packaging systems, methods, machinery, and apparatus for wrapping various articles and for placing the wrapped articles into boxes. This invention provides a number of novel features, certain of which are applicable to and advantageous for the wrapping and packaging of articles generally—that is to say, without specific restriction as to the particular character of the articles being handled. However, the system, methods, machinery, and apparatus described herein as illustrative of the invention are particularly adapted for attractively packaging confections in wrapper cups in boxes, and will be described for use in packaging assorted chocolates. The wrapper cups illustrated herein have the familiar frustro-conical shape and are formed from suitably shaped blanks so as to have a fluted or crinkled side wall, for use as an open top container for confections of various kinds, commonly being referred to as crinkle cups.

Among the many advantages provided by the illustrative embodiment of the invention described herein are those resulting from the fact that the wrapping of the articles and the loading of the articles into their boxes are carried out with continuous movement. Also, the articles are loaded into their wrapper cups while both the articles and wrappers are continuously moving. During these operations the articles are automatically handled with gentle continuous movements which avoid sudden accelerations and decelerations. Thus, fragile or soft articles such as confections are packaged without damage. Because of the continuous motion provided during the wrapping and boxing operations, a desirably high packaging rate and high over-all efficiency are obtained.

Moreover, in loading a box, each article together with its wrapper is placed down into the box in a precisely controlled position. Thus, advantageously, the article and wrapper can be inserted down into a closely packed box without disturbing or damaging any of the articles previously packed into the box. By virtue of the precise control provided, the various articles are enabled to be arranged in the boxes in accordance with a predetermined desired pattern or configuration. In the example described as illustrative of the invention, assorted chocolates are accurately placed one at a time into a box so as to create a closely packed and attractive box of candy.

In this specification and in the accompanying drawings, are described and shown embodiments of the invention and various modifications thereof are indicated, but it is to be understood that these are not intended to be exhaustive nor limiting of the invention, but on the contrary are given for purposes of illustration in order that others skilled in the art may fully understand the invention and the manner of applying the packaging system, machinery and apparatus in practical use so that they may modify and adapt it in various forms, each as may be best suited to the conditions of a particular use.

The various objects, aspects, and advantages of the present invention will be more fully understood from a consideration of the following specification in conjunction with the accompanying drawings, in which:

FIGURE 1 is a plan view of a packaging system and machinery embodying the present invention. A main conveyor is shown carrying the boxes to be loaded, extending through the center of the drawing. There are two lines of machines extending along on both sides of the main conveyor for loading the various articles into suitable wrappers and then for placing the wrapped articles down into the boxes in predetermined positions therein. All of these wrapping and box loading machines are identical, except for slightly different adjustments, as explained in detail below, to accommodate different sizes of articles and to place the respective articles in the various predetermined desired positions within each box. Each wrapping and box loading machine may be considered to be in the nature of a satellite of the main conveyor for it operates in timed relationship with the continuous movement of the main conveyor. In this example of the invention, each wrapping and box loading machine places an article into a cup-like wrapper and then places the article together with its cup down into the box at the desired position.

FIGURE 1A is a side elevational view of one of the individual machines of FIGURE 1, shown on enlarged scale, and seen in association with the main conveyor which is illustrated in end elevation.

FIGURE 2 is a side elevational view of a portion of one of the individual machines of FIGURE 1, for example, being a view taken along the line 2—2 of FIGURE 1 and shown on greatly enlarged scale. The portion of the machine shown in FIGURE 2 is seen in FIGURE 1A and includes the apparatus for supplying the wrapper cups, for accurately positioning the cups at spaced intervals along a continuously moving cup conveyor, and for loading the articles into the cups as the cups move along the cup conveyor;

FIGURE 3 is an elevational sectional view of the other portion of the machine which is shown in FIGURE 2, being a view taken along the line 3—3 of FIGURE 1 and shown on the same enlarged scale as FIGURE 2. The machinery shown in FIGURE 3 corresponds generally with the assemblies 37 and 40, which are shown by dashed outline in FIGURE 1A and serves the function of taking the wrapped articles and precisely placing them down into the boxes which are travelling along on the main conveyor;

FIGURE 4 is a vertical sectional view of the apparatus for placing the wrapped articles down into the box; this view is taken along the line 4—4 of FIGURE 3 and shown on enlarged scale;

FIGURE 4A is a perspective view of a sweep arm, which is seen also in FIGURES 3, 4, 20 and 21;

FIGURE 5 is a view in side elevation of the mechanism for supplying and delivering the wrapper cups, including a magazine for empty cups, dispensing apparatus for removing the cups one at a time from the bottom of the magazine, and for accurately positioning the cups on a continuously moving cup conveyor at predetermined uniformly spaced points therealong;

FIGURE 6 is a horizontal sectional view of the magazine for the wrapper cups, being taken along the line 6—6 of FIGURE 5;

FIGURE 7 is a vertical sectional view of the cup conveyor and vacuum apparatus associated therewith, the section being taken along the line 7—7 of FIGURE 5 and shown on enlarged scale;

FIGURE 8 is a plan view of the cup supplying and positioning apparatus of FIGURE 5;

FIGURE 9 is a view in perspective showing the vacuum chamber which briefly retains the empty cups in position over the cup conveyor belt until the belt has moved into a predetermined desired position, at which time the cup is automatically released from its position adjacent to the vacuum chamber;

FIGURE 10 is a plan view of the escapement mechanism for releasing the articles one at a time in synchronized relationship with the continuous operation of the remainder of the system, the articles being released into a launching station from which they can be picked up with a continuous movement and put into the wrappers;

FIGURE 11 is an elevational sectional view taken longitudinally through the escapement mechanism of FIGURE 10 along line 11—11;

FIGURE 12 is a right side elevational view of the escapement mechanism of FIGURE 10, as seen in the direction of the arrow 12;

FIGURE 13 is a left side elevational view of the escapement mechanism of FIGURE 10, as seen in the direction of the arrow 13;

FIGURE 14 is a view, on enlarged scale, showing the operation of the release gate mechanism;

FIGURE 15 illustrates the wrapper loading assembly for picking up the articles one at a time from their launching position and then for positioning the article down into the wrapper cups as the cups are travelling along on the conveyor beneath the wrapper loading assembly;

FIGURE 16 is a partial view showing details of the operation of the assembly of FIGURE 15;

FIGURE 17 is a top view of the wrapper loading assembly of FIGURE 15;

FIGURE 18 is an end view in elevation of the wrapper loading assembly of FIGURE 15;

FIGURE 19 is a view in perspective illustrating the advantageous operation of loading an article into the continuously moving wrapper cup;

FIGURE 20 is a top view of the box loading machinery of FIGURE 3;

FIGURE 21 is a view in side elevation of the box loading machinery of FIGURES 3 and 20, this view being seen in the direction of the arrow 21 in FIGURE 20.

FIGURE 22 is an elevational view, on enlarged scale, of the adjusting apparatus on the opposite side of the box loading machine from that seen in FIGURE 21; and FIGURE 23 is an end elevational view of the apparatus of FIGURE 22 as seen looking in the direction of the arrow 23.

*General description and operation*

As shown in FIGURE 1, a main conveyor generally indicated at 2 progresses continuously in the direction of the arrow and carries the boxes 4, which are being loaded. This conveyor comprises an endless chain 5 and 6 (please see FIGURE 1A) having brackets 8 mounted thereon at uniformly spaced points and adapted to support and move respective ones of the individual boxes 4. The chains 5 and 6 are each supported and guided along parallel paths, as shown in FIGURE 1A, by means of pairs of upper and lower guide rails 12 and 13, and the conveyor is driven by a main drive motor located at a convenient position along the path of the conveyor. The main drive motor is coupled to the conveyor by a pair of sprockets on a common shaft, not shown, and engaging both chains 5 and 6, as will be understood.

In order to place the articles 16 in their wrappers 18, (please see FIGURE 19) and then to load the wrapped articles down into the boxes 4 in the desired respective positions therein, there are provided two lines of identical machines 20, as shown in FIGURE 1. These machines 20 are conveniently adapted to be spaced along opposite sides of the main conveyor 2 in any suitable relationship, for example, as shown they are placed in staggered relationship. Each machine 20 may be adjusted as desired to handle an article of a particular size and shape. In this example, the articles 16 being handled are confections in the form of assorted chocolate candies. The chocolates 16 are placed in their wrappers, which are here shown as being the familiar cup-type wrappers 18, and then each cupped chocolate is accurately inserted down into the box 4 in a precisely determined and carefully controlled position, as seen in FIGURES 3 and 21.

At the left end of the portion of the machine 20 which is shown in FIGURES 1A and 2 is located the wrapper supplying and positioning apparatus, generally indicated at 22. This apparatus 22 is illustrated in detail in FIGURE 5, and is shown as being adapted for handling wrappers in the form of crinkle cups 18 and for positioning the cups at spaced intervals along a continuously moving substantially horizontal vacuum conveyor, generally indicated at 24. As the empty wrappers 18 move along on the vacuum conveyor 24 toward the right they pass beneath an escapement and launching mechanism 26 (FIGURES 1A and 2) for supplying the articles to be wrapped.

To feed the articles into the mechanism 26 of each satellite machine 20, there are provided, as shown in FIGURE 1, a short continuously moving wide belt conveyor 28 and a rotary vibratory platform conveyor 30. The rotary conveyor 30 holds a relatively large reserve of the articles and continuously circulates the articles in the direction of the arrow 31. The operator manually loads the wide belt conveyor 28 from a tray simply by sliding the articles off from the tray onto the conveyor, and then the articles move in a group from the conveyor 28 onto the vibratory platform 30. In a chocolate packaging operation, the operator conveniently brings the freshly made chocolates from the manufacturing stage on the tray-like "tote boards" customarily used for carrying the candies and slides the chocolates from the tote board onto the belt 28.

It is to be noted that the belt conveyor 28 continuously tries to "over feed" the articles onto the rotary conveyor 30. That is, the conveyor 28 provides a reserve supply of the articles and continuously tries to feed these additional articles onto the rotary conveyor. If the rotary conveyor is full, then the additional articles remain on the belt conveyor 28, but as soon as the rotary conveyor begins to empty, then the belt conveyor feeds more articles onto the rotary conveyor. This "over feed" arrangement assures that there are always articles present going into the escapement and launching mechanism 26.

As the articles circulate in the direction of the arrow 31 they progress outwardly, more or less in a spiral, toward the perimeter of the platform 30 and then slide down a ramp 32 in single file into the rear end of the escapement and launching mechanism 26. At timed intervals the articles move to the launching station X in the mechanism 26. From this launching station the articles are picked up by means of a pair of opposed spoon-like grasping members 33 (FIGURES 2, 11, 15, 18 and 19) which project down and move along beneath a wrapper loading assembly 34. This wrapper loading assembly 34 is here illustrated by way of example as being adapted gently to pick up soft chocolate candies one at a time from the station X and then advantageously to place them down into the wrapper cups 18 while the cups move continuously along with the cup conveyor 24. This highly advantageous cupping operation is illustrated very clearly in FIGURE 19. The wrapped articles, such as the cupped chocolates being shown, continue moving along on the cup conveyor 24 and are discharged at the right onto a smoothly polished dead plate 36 (FIGURES 2 and 3) which is flush with the surface of the cup conveyor.

From this dead plate 36 the wrapped articles are automatically loaded into the boxes by the box loading machinery 37 shown in FIGURES 3, 4, 20, and 21. As shown in FIGURE 4 the article 16 in its wrapper 18 is moved off from the dead plate 36 by means of a sweep arm 38 having a contoured V-shaped centering hook therein. In this way the wrapped article becomes centered directly over the axis 39 of a vertical loading inserter mechanism 40 while the article is being slid over the surface of the dead plate 36 toward its edge 42.

After leaving the edge 42 of the dead plate the wrapped article rests upon a resilient trap door 44 of the travelling injector mechanism 40 and is positioned directly over the inner converging guide channel 46 defined by the multiple resilient inner and outer conically arranged guide fingers 47 and 48 of the inserter mechanism. This inserter mechanism is swept around an oblong circular path 35 by the box loading machinery 37, as indicated in FIGURE 20, thus carrying the wrapped article around to a precisely determined position over one of the boxes 4 on main conveyor 2.

At the appropriate times, the inserter mechanism moves down into position as shown in FIGURES 3 and 21, and then a plunger 50 (please see FIGURE 4) moves down past the contoured notch in the sweep arm and pushes the wrapped article down through the trap door 44. The article in moving down through the converging guide channel 46 causes the sets of guide fingers 47 and 48 to spread apart somewhat. Thus, the longer outer guide fingers 48 gently open up a suitable space in among the other wrapped articles which may already be in the box. As soon as the wrapper 18 touches the floor of the box, the guide fingers 48 begin to retract while the plunger 50 dwells in its lowermost position. When the wrapper 18 and article 16 are clear of the tips of the fingers 48, then immediately, but not sooner, the plunger 50 begins to retract also in readiness for the next cycle. In this way the plunger 50 holds the wrapped article down in position in the box while the guide fingers 48 are withdrawn clear of the wrapped article.

*Supplying and accurately positioning the wrappers on the vacuum conveyor*

In order to supply the wrappers and position them accurately on the vacuum conveyor 24, there is provided the wrapper supplying and positioning mechanism 22, as discussed generally above, which is located at the left or input end of FIGURE 2, and is shown in detail in FIGURES 5 through 9, inclusive, to which attention is now directed.

The wrappers 18 are shown in this example of the invention as being crinkle cups. These cups are manufactured in nested groups of two dozen or more cups in each group. The groups of cups are stacked in inverted position within a magazine 50 located directly over the vacuum conveyor 24 and formed by four vertical rods 52 (FIGURE 6) held by mounting means 54 on a top plate 55. This top plate spans over the vacuum conveyor and is secured to the upper ends of a pair of support columns 56 which are connected to one of the main frame members 58 of the machine. As shown in FIGURE 8, the other end of the top plate 55 is secured to another support column 59 extending up from the other main frame member 60 on the other side of the vacuum cup conveyor 24.

In the center portion of the top plate 55 directly beneath the magazine and over the centerline of the conveyor 24 is a large round opening 61 forming the discharge mouth of the magazine 50. This opening 61 is smaller than the normal relaxed size of a group of nested crinkle cups. Thus, the top plate 55 engages beneath the rim of the lowermost group of cups sufficiently far to assure support for the stack of cups even when the magazine is fully loaded. But, the opening 61 should not project inwardly any farther than necessary to provide adequate support for a full stack, because it must also provide sufficient clearance to allow a partially collapsed cup to be withdrawn therethrough.

For dispensing the cups one at a time, a vacuum plunger 64 is provided having a truncated conical suction head 66 with a maximum diameter less than the clearance within the discharge opening 61. As indicated in FIGURE 5 by the various dash-and-dotted outlines of the suction head 66, the vacuum plunger reciprocates up and down, and it also swings through an arc of 180° as it moves along through the intermediate portion of its stroke. At the upper end of its stroke as shown at position 66a, the suction head enters up into the lowermost cup and reduces the pressure therein by means of the multiple suction openings 67 which are located in the exposed end of the suction head as well as in its generally conical surface. Because of the reduced pressure therein, the fluted walls of the lowermost cup collapse inwardly somewhat and hug against the generally conical surface of the head 66. Thus, as the head moves down to the position 66b it withdraws this one cup with it and leaves the remainder of the cups supported on the stops 62. For the most effective operation in collapsing and withdrawing the individual cup wrappers the generally conical surface of the head 66 is formed with a fluted configuration adapted to mate with the inner surface of a partially collapsed cup wrapper. The transverse suction openings 67 each communicate with at least one of the channels in the conical fluted surface of the head. Thus, the inner surface of the fluted wall of the cup is sucked into the channels in the fluted head.

As seen in FIGURE 8, the hollow shank of the vacuum plunger 66 forms a right-angle elbow 68 and connects to one end of a hollow rotatable vacuum shaft 70 which is journaled in a pair of sleeve bearings 72 and 73. In order to rotate the vacuum shaft 70, a pinion gear 74 is secured to the center portion thereof and engages a rack 76 mounted on the inner face of one of the columns 56. Thus, as the vacuum plunger moves down from the position with its head at 66b, the pinion gear 74 engages the upper end of the rack 76 and swings the head down to the position 66c, at which time the pinion disengages from the lower end of the rack, and vice versa, on the upstroke.

To hold the plunger in position for substantially rectilinear motion at opposite ends of its stroke, when the pinion gear 74 is disengaged from the rack 76, the rotatable shaft 70 is formed with opposed flat surfaces engaging retainer leaf springs, as will be understood.

From the position 66c down to the position 66d the suction head moves substantially straight down, delivering the cup 18 (please see also FIGURE 9) and placing it upon the small porch-like platform area 78 of an advantageously operating vacuum chamber 80, which will be explained in detail further below.

For purposes of assuring that the cup wrapper 18 is removed from the suction head at the bottom of its stroke, a mounting 69 (FIGURE 5) is secured to the support columns 56 and 59 and a pair of parallel resilient flexible elements 71 held thereby and extending across the wrapper conveyor 24. These parallel elements 71 comprise thin spring strips and are spaced apart slightly less than the width of the mouth of the cup wrapper. During the downward stroke of the plunger head the cup wrapper is driven down between these parallel elements, which become bowed outwardly and engage just above the lip of the wrapper. Upon the upward stroke, the plunger head slips out from between these parallel elements 71, but the wrapper is caught and remains in position below them.

In order to supply the vacuum to the hollow shaft 70, a vacuum source is provided by a flexible hose 82 which is connected to one end of a tube 83 that is connected at its other end to a cap 84 mounted on the sleeve bearing 72 and embracing the end of the shaft 70. A rotary sleeve valve for controlling the suction is formed by a hole 85 in the wall of the hollow shaft 70 which communicates with the adjacent end of the tube 83, except when the plunger has rotated down to its bottom position. Then, the hole 85 in the hollow shaft 70 is turned within the cap 84 to such a position that the vacuum source is momentarily interrupted. This interruption of the suction occurs as the suction head reaches the position 66c. Because of the entry of air through the flutes of the cup into the openings 67, the suction within the head 66 rapidly diminishes, and the cup is released from the head 66 just as the head reaches the lowest position 66d adjacent to the vacuum chamber 80. It will be appreciated that the tube 83 must be allowed to slide back and forth slightly through its guide bracket 86 so as to follow the motion of the cap 84, as the plunger 64 reciprocates up and down.

For reciprocating the plunger 64, a swing arm 88 is pivoted on a shaft 89 mounted in a pair of pillow blocks 90 and 91 supported on an end plate 92 connected to the ends of the frame members 58 and 60. The swing arm is driven by an eccentric mechanism 93 including a drive gear 94 engaging a driven gear 95 secured to a crank shaft 96 carrying an eccentric disk 97 and is pivotally connected by a pin 99 to the arm 88. The ends of the shaft 96 are journaled in a pair of pillow blocks 100 and 101 mounted upon angle brackets 102 and 103, respectively, which are secured at 104 and 105 to the end plate 92.

As shown in FIGURE 8, the back portion of the swing arm adjacent to its support pivot 89 includes a pair of closely spaced parallel levers 106 and 107 rigidly interconnected by a pair of gusset straps 108 and 109. A counterbalance tension spring 110 extends from an anchor pin 112 on the end plate 92 adjacent to the main support leg 114 up to a spring pin 116 in the back end portion of the arm 88.

The front portion of this arm 88 comprises a pair of bars 117 and 118, connected to the front ends of the levers 106 and 107, respectively, and straddling the rack 76 and its supporting column 56. To hold the bearings 72 and 73, the front ends of these bars are slotted, as shown in FIGURE 5 at 120. As the shaft 70 moves up and down it is guided by the narrow vertical spaces between the pairs of guide rails 121 and 122 mounted on the inner faces of the columns 56.

Although at first glance various crinkle cups of the same size and material may appear to be identical, actually there are marked differences between them because groups of cups are die cut and fluted from stacks of approximately twenty-five sheets of material. As a result, the cups are fluted while approximately twenty-five of them are nested together. The outermost cup in each nest, upon careful examination, will be found to have a fluted wall wherein the convex portion of each flute bulges outwardly and sharp creases or ridges between each flute project inwardly. In the innermost cup the relationship is exactly reversed. The convex portion of each flute bulges inwardly and sharp creases or ridges face outwardly. The successive intermediate cups show a progressive transition from one extreme to the other with regard to the configuration of their fluted walls. Consequently, for certain batches of cups 18 there may be an occasional tendency for two cups to stick together and be withdrawn simultaneously from the magazine 50. To prevent the placement of two nested cups upon the conveyor 24, it is preferable to place a cup-stripper 123 beneath the mouth of the magazine. This cup-stripper comprises a bracket arm having a curved resilient friction pad 123 positioned adjacent to the path followed by a cup when the cup is held by the suction head 66 near the mid-position of its downward travel. If there are two cups on the suction head, the outer one is bumped by the convex surface of the rubber cup-stripper 123 and is peeled off on the downstroke from the inner cup, which remains held on to the head 66 by the suction.

In order to understand the advantageous co-operation of the vacuum chamber 80 and vacuum conveyor 24 with the plunger 64 it will be helpful first to consider the structure of the vacuum conveyor 24, as shown in FIGURE 7. This conveyor includes a vacuum housing 124 between the frame members 58 and 60, and as shown in FIGURE 2 a reduced pressure is maintained continuously therein by suction applied through a pipe 125. The vacuum housing 124 includes a bottom plate 126 and a pair of side plates 127 and 128 forming a rigid interconnection for the frames 58 and 60. A pair of angle brackets 129 and 130 support a pair of angle irons 131 and 132, with their upstanding legs forming parallel rails. Along these rails continuously travels the conveyor belt 134, having centrally positioned uniformly spaced holes 136.

For purposes of synchronizing the continuous movement of the holes 136 of the cup conveyor belt 134 with the overall operation, the belt has gear teeth 135 extending along the underside of both margins. For example, this flexible belt may conveniently be made by using a rubber timing belt and machining off the middle portion of the teeth to provide a smooth lower surface, as seen in FIGURE 7 riding against the rails. Thus, the teeth 135 guide the belt along the rails, while the pressure differential holds it down.

The conveyor belt 134 itself is used as the source of power to drive the eccentric mechanism 93. It passes around a gear drum 137 which is on a shaft 138 in common with the drive gear 94. The path followed by the conveyor belt is shown in FIGURE 2. After passing up around the gear drum 137, the belt moves forward until it reaches a discharge drum 140 and transfers the cupped chocolates onto the dead plate 36. It will be noted that the vacuum housing terminates at a partition 142 which is beyond the position wherein the cups are loaded, and a support roller 144 is positioned beneath the belt near this partition.

After passing down around the drum 140, the belt travels back and around an adjustable tension roller 146 and then forward and around a gear drum 148 on a shaft 149 which is driven by a main drive sprocket 150 and a chain 151. From the driving drum 148 the belt runs back to the driven drum 147, thus completing its course. A suitable belt 134 is U.S. Rubber #14H200, modified as described.

In order to assure that the cups 18 are positioned in centered relationship over the respective holes 136 in the conveyor belt 134, the vacuum plunger 64 deposits the cups one at a time upon the small porch platform 78 (FIGURE 9) adjacent to the sloping end wall 152 of the vacuum chamber 80. As shown in FIGURE 7, this chamber 80 is mounted over the belt 134 by means of a pair of brackets 153, secured to the frame members 58 and 60.

By virtue of the positive driving relationship maintained between the motion of the conveyor belt 134 and the movement of the vacuum plunger 64, each cup is positioned on the platform 78 at a time when one of the suction holes 136 has already reached a position beneath the vacuum chamber 80, as shown in FIGURES 7 and 9. Thus, a reduced pressure has been established within the chamber 80, causing a strong suction to exist at the opening 154 near the foot of the sloping wall 152 for holding the cup in place. The time allowed for each hole 136 to travel the length of the vacuum chamber 80 must be equal to or larger than the time required for the suction head 66 to lift up out of a cup on the porch platform 78.

This suction opening 154 and the platform 78 retains the cup in the desired laterally centered position while the hole 136 approaches beneath the vacuum chamber 80. As soon as the hole 136 exits from beneath the chamber 80, the pressure therein quickly rises to atmospheric pressure, and the suction force previously applied by the opening 154 disappears, thus releasing the cup. The narrow continuous region 156 of the platform 78 prevents the suction of the hole 136 from being applied directly to the bottom of the cup 18 until the hole reaches the inner end 157 of the slot 158. At the point 157 the suction of the hole 136 is applied to the centerpoint of the bottom of the cup and begins to move the cup along with the conveyor. The cup slides off from the platform 78 and continues moving in accurately centered relationship both longitudinally and laterally with respect to the suction hole 136.

*Automatically supplying and loading articles into the continuously moving wrappers*

For automatically supplying the articles and loading them into the continuously moving wrappers, the machinery of FIGURES 10 through 19, inclusive is utilized. As described previously, the articles are conveyed to the ramp 32 and slide down the smooth polished metal surfaces of this ramp single file into the escapement and launching mechanism 26. At the foot of the ramp, the articles 16, which are illustrated here as chocolates, move into a continuously moving narrow launcher belt 160. Preferably the outer surface of this belt 160 is coated with a smooth flexible durable material having a low coefficient of sliding friction, for example, a slippery plastic, such as a "Teflon" polytetrafluorethylene coating, because the launcher belt must be sanitary, and it must slide easily beneath the candies when desired. This narrow belt 160 is driven by a flanged pulley 161 and slides over a support pad 162. At the launching end of the assembly 26, the belt passes over a freely turning roller 163 mounted on a stationary adjustable shaft 164 between a pair of guides 165 which are fixed to the shaft. For adjusting belt tension, the ends of the shaft 164 can be moved along a pair of slots 166 in the respective side plates 167 and 168 by means of adjusting screws 169.

The continuous motion of the belt brings the file of candies forward until the leading candy bumps up against a release gate 170 of an escapement mechanism also including a pair of holding pads 172 and 173 which are mounted on the ends of a pair of retaining fingers 174 and 175. These pads 172 and 173 close gently against opposite sides of the second candy in the file while the first candy is released by the gate 170, and then the second candy is released and the file moves up against the gate again, and so forth.

In order to control the gate 170 so as to move it down to its retracted position 170', it is fixed on a rotatable shaft 176 having a spring-biased control cam on one end, as shown in FIGURES 12 and 14, at 178. A normally-disengaged latch detent 180 on a shaft 181 is controlled by a rotary solenoid 182', and upon energization of this solenoid the detent 180 swings down behind a lip 183, as seen in FIGURE 12, to hold the gate upright. Normally this detent 180 remains out of operation, as shown in FIGURE 14. The purpose of this detent 180 is to enable the operator to restrain the chocolates in the respective machines 20 while the main conveyor is being started up in the morning. Then the successive detents 180 of the various machines 20 are disengaged in sequence as the leading box 4 progresses along the main conveyor from machine to machine, thus releasing the successive lines of chocolates in proper timed relationship to begin being wrapped and loaded into the respective boxes. It is to be noted that the gate 170 is in two parts, as illustrated in FIGURE 10, and these straddle the narrow belt 160.

When the detent 180 has been disengaged, then the movement of the control cam 178 is regulated solely by rotation of a cam wheel 182 having outer and inner projecting roller lugs 183' and 184, respectively. Upon each rotation, the outer lug 183' engages the flat cam surface 186 of the control cam 178 and pushes it downwardly as shown in FIGURE 12. In this way the gate 170 is raised, against the action of a tension spring 187 which extends between a mounting pin 188 on the control 178 and another mounting pin 189 on a pivoted latch detent lever 190 having a pivot screw 191. As soon as the gate is fully upright, the spring 187 pulls the detent lever upwardly, as shown in FIGURE 12. A small block 192, which is secured to the lever 190, engages up into a notch 193 so as to hold the gate upright against the action of the spring 187. As the wheel 182 continues to rotate, the inner lug 184 subsequently strikes the tip end of the detent lever 190 to depress it. This moves the small block 192 down out of the notch 193, releasing the gate, and immediately the spring 187 snaps the gate 170 down to its open position 170' against a stop pin 194 (please see FIGURE 11). As the gate snaps down, the leading chocolate is released and moves along with the narrow launcher belt 160 until its center of gravity reaches the precisely predetermined launching station within the narrow range X.

For driving the cam wheel 182, a ribbed timing belt sprocket pulley 196 is secured to the shaft 197 of the wheel 182, and a timing belt 198 extends between this ribbed pulley 196 and a ribbed driving sprocket pulley 199 on a shaft 200 in common with the pulley 161. The power input for operating the mechanism 26 is fed in by means of the shaft 200. To maintain proper timed relationship, there is a positive driving relationship between the motion of the cup conveyor belt 134 and the shaft 200. This positive drive is provided by a sprocket 202 connected by a chain 203 to a corresponding sprocket 207 (FIGURE 1A). The sprocket 207 is driven by means of a chain 213 from a suitable sprocket on a shaft 264, which is driven by the sprocket 150 and chain 151, as described above.

In order to hold back the other chocolates when the first one is released by the lowering of the gate 170, the two opposed soft pads 172 and 173 are gently pressed against opposite sides of the second chocolate. As seen in FIGURE 10, these pads are carried on the free ends of small easily adjusted extension elements 204 and 205 attached to the ends of the swinging fingers 174 and 175, respectively. A resilient drive member 214, shown as a leaf spring, serves to limit the force applied to the sides of the chocolates. It will be appreciated that there is a random variation in size and shape between chocolates of the same kind, and the resilience of the springs 204 and 205 protects the larger candies against the possibility of crushing between the pads 172 and 173.

The swinging fingers 174 and 175 are operated by vertical shafts 208 and 209 having actuator levers 211 and 212 secured to their lower ends. These actuator levers are each pivotally connected to a longitudinally reciprocating pusher block 212 which is driven by a leaf spring 214 (FIGURES 10 and 11) projecting laterally out through a slot 215 in the side plate 168. This spring 214 also protects the chocolates, as discussed above. It is connected to the end of a reciprocating slide 216, which is held in place by a headed pin 218 engaging a slot in the slide 216, as seen in FIGURE 13.

To drive this slide 216 back and forth and to enable adjustment of the cycle of operation of the holding pads 172 and 173 with respect to the periodic opening and closing of the gate 170, there are provided a rotating pusher cam wheel 220 secured to the shaft 197 and a ring gear 221 which engages this wheel. By manually removing a retaining collar 219 (please see FIGURE 10) and disengaging the ring gear 221 from the wheel 220, then the operator can rotate the ring gear 221 with respect to the wheel 220 to adjust the angular position of an outer trigger lug 222 mounted on the ring gear 221 with respect to an inner pusher cam 223 fixed to the inner surface of the wheel 220. This adjustment accommodates different sizes of candies. Those chocolates which have a longer length are positioned farther from the gate 170 when they are released by the pads 172 and 173, because of the corresponding longer length of the first chocolate which was behind the gate. Accordingly, the holding pads 172 and 173 should be released sooner after the gate 170 springs open to provide more time for a longer chocolate to advance up to the gate 170. In fact, the long chocolates may be released by the pads while the gate is still open. Then the gate closes just before the advancing chocolate reaches it. Thus, advantageously, the speed of the belt 160 does not require changing to handle different sizes of candies. Instead, the cyclic timing is conveniently changed. Shorter candies have less distance to travel and are released later in each cycle to prevent their reaching the gate before it has closed. Also, the effective lengths of the swinging elements 204 and 205 are adjusted for various sizes of candies by loosening the pairs of screws 225 (FIGURE 12) which pass through slots 227 therein.

In operation, the trigger lug 222 periodically raises the end of a trip lever 224 pivotally mounted on a shoulder screw 226 so as to release the interengaged detents 228. When the slide 216 is released, a tension slide spring 230 connected between a fixed stud 231 and a pin 232 on the slide pulls the slide toward the left in FIGURE 13, causing the holding pads 172 and 173 to swing apart to release the line of chocolates and allow them to move up against the gate 170. The pusher cam 223 strikes the end of the reciprocating slide 216 and pushes it back, closing the pads 172 and 173 upon the second chocolate in the file, and allowing a lever spring 234 to re-engage the detents 228, in readiness for the next cycle.

As shown in FIGURE 11, the article 16 which was released by the gate 170 moves forward on the narrow launcher belt 160, and as it does so, a pair of spoon-like grasping members 33 move along on opposite sides of the launcher belt with their concave surfaces adjacent to opposite sides of the article 16. The speed of these members 33 is synchronized with the movement of the article 16. When the center of gravity of the article is within the narrow range X, which is called the launching station, then the bowls of the members close gently against the article and lift it away from the launcher belt as the belt curves down around the roller 163.

It will be noted that the tips of these grasping members actually straddle the narrow launcher belt. In this way the spoon tips are enabled effectively to curve in beneath the article. Thus, the tips of the members 33 provide a wedge-like configuration which is extremely advantageous in loading the wrappers as will be described further below.

Now the advantageous operation of the escapement mechanism 26 will be more fully appreciated, because it enables adjustment for handling a wide range of sizes of articles without changing the speed of the launcher belt. Thus, the synchronism between the launcher belt and the grasping members 33 is always maintained regardless of the particular size of article being handled.

FIGURES 15, 16, 17, 18, and 19 illustrate the operation of the wrapper loading assembly 34. The two sides of this assembly are identical, as seen from FIGURES 17 and 18, except that there is only one control and guidance track 240, and accordingly corresponding reference numbers are used for corresponding parts on both sides. The spoon-like grasping members 33 project down from a pair of travellers 242 which can slide together and apart along a slide rod 243 which is supported at its center by a bracket 244 connected to the cross bar 246 of a movable carriage 248. There are two of these carriages, which are identical and revolve along a path 254' as shown in FIGURE 15. The carriages 248 are driven so that the grasping members 33 move along near the belt 134 in synchronized relationship with respect to the suction holes 136 in the conveyor belt 134. At opposite ends of the cross bar 246 are chain blocks 250 each of which is pivotally connected by a pin 252 with one of a pair of drive chains 254. As seen in FIGURE 17, each carriage 248 has a wide U-shape as defined by the cross bar 246 and the two chain blocks 250. The respective points of connection of the two chain pins 252 are at the ends of these two chain blocks.

As shown in FIGURE 2, the conveyor chains 254 are driven by a sprocket chain 256 engaging a drive sprocket 257 on a shaft 258 secured to a gear 259 which is driven by a gear 260 on the shaft 149. The chain 256 passes around a sprocket 266 on the end of a shaft 267 carrying a pair of sprockets 268 which drive the two chains 254.

It will be noted that the drive chain 256 also serves to drive the inserter mechanism 37, as is shown in FIGURE 1A. This chain 256 drives a sprocket 261 which is connected through a pair of bevel gears (not shown) so as to drive a shaft 262, and this shaft 262 is connected by the bevel gears 263 to the inserter mechanism 37.

In FIGURE 17, the dash and dotted line 254' illustrates the centerline of the path of revolution followed by the two chains 254. After passing up around the sprockets 268, the respective chains 254 follow upwardly inclined straight paths to the tops of a pair of sprockets 270, each of which freely turns on a fixed stub shaft 271 held by a nut 272 on one of the main side frame plates 274. While moving from the sprocket 268 to the sprocket 270, each chain is supported and guided by an upwardly inclined rail 276.

For grasping the article 16 and then for introducing the article carefully and accurately into the wrapper 18, each chain 254 is guided as shown in FIGURE 16, by matching upper and lower guide rails 278 and 280, which engage the chain as shown in FIGURE 18. These guide rails are suitably secured to the respective side frame plates 274, and the side plates 274 are held in spaced parallel relationship by corner braces 282, by internal transverse braces 284 and 285, and by a removable cover 286 extending over the top and down both ends.

During the initial part of the travel from the sprocket 270 the chain 254 travels along a horizontal path segment H-1 which is almost parallel with the path of travel of the article 16 on the launcher belt 160, as shown in FIGURE 11. Actually, the belt 160 is inclined downwardly slightly, so that the path segment H-1 diverges slightly from the launcher belt. Consequently, as soon as the members 33 have grasped an article they begin to lift it gradually away from the launcher belt.

After the spoon members 33 have cleared the end of the launcher mechanism 26, the chain 254 travels down a path segment C converging with the vacuum conveyor 24. While moving down the inclined path segment C, the tips of the spoon members 33 gently enter the open top of a wrapper, as shown in FIGURE 19, and spread the wrapper open to admit the article 16.

Then the chain 254 continues along a second horizontal path segment H-2 parallel with the conveyor belt 134 while the spoon members are opened to release the article within the wrapper. Finally, the chain 254 moves up a straight inclined path segment D which diverges from the vacuum conveyor and withdraws the spoon members 33 from the wrapper.

It has been found to be advantageous to maintain the shanks 288 of the spoon members vertical while the carriage 248 is progressing along all four path segments H-1, C, H-2, and D. The reason for this preference is that the spoon members 33 should be travelling in substantially synchronized relationship with the cup 18 as the members enter, open therein, and then leave the cup. If there is a substantial differential in speed between the spoon members 33 and the belt 134, then the spoon members may tend to push the wrapper into a misaligned position. However, after the spoon members have completely cleared the wrapper on the divergent path D, then the shanks 288 may begin to swing along an arcuate path as shown at the extreme right in FIGURE 19. If swinging movement of the shanks 288 were permitted to occur along any of the path segments H-1, C, H-2, or D, then the horizontal component of velocity of the spoon members due to the swinging movement would be added to or subtracted from the horizontal component of velocity due to the speed of the chain 254. Accordingly, the velocity of the spoon members would deviate from a substantially constant relationship with respect to the conveyor belt 134. By maintaining the shanks 288 at a fixed attitude during these critical path segments H-1, C, H-2, and D, a more uniform velocity relationship is provided with respect to the belt 134. Actually, during the covergence C and divergence D the horizontal component of velocity of the spoon members 33 is less than the horizontal velocity which occurs at H-1 and H-2, because the horizontal component of velocity along the path segments C and D is reduced by the sine of the angle of inclination of path segments C and D. Accordingly, the inclination of these path segments C and D should not exceed an upper limit of approximately 40° to 45°, depending upon the size of the wrapper 18. The larger and shallower the wrapper is, then the more tolerant it is of steeper path inclinations at C and D, because the tips of the spoons can begin entering the front portion of the wrapper. The size of the wrapper will then accommodate the differential in horizontal velocity until the spoon members have fully descended and their tips have become aligned with the center portion of the wrapper. Similarly, upon divergence, the tips of the spoon members will be accommodated by the rear portion of the large wrapper. It is found to be preferable to use an inclination of approximately 30° or less so that the horizontal velocity ratio does not fall below 0.85, because this will enable the proper loading of a vast range of sizes and configuration of wrappers.

In order to maintain the shanks 288 vertical during the wrapper loading operation, the carriage 248 is maintained horizontal by the co-operative action of the guidance and control track 240 with respect to the path 254'. The track 240 comprises a fixed outer guide band 290 which is held by brackets 291 and is uniformly spaced from a fixed inner guide plate 292. A control wheel 294 is mounted on the carriage 248 adjacent to the opposite end of one of the chain blocks 250 from its pin 252. This wheel travels in the space between the guides 290 and 292, and by maintaining the axis of the wheel 294 at the same elevation as the axis of the pin, the carriage is maintained horizontal. The path followed by the axis of the wheel 294 is shown in FIGURE 15 by the dashed line 294'. It is parallel to but displaced behind the path 254' during both the convergent path C and divergent path D. It will be noted that the shaft 267 is recessed into one end of the guide plate 292, and the shaft 267 is engaged by the rim of the wheel 294 during part of its passage around the shaft 267, thus swinging around with a minimum radius and conserving space.

To control the opening and closing of the spoon-like grasping members 33, a tension spring 296 interconnects the travellers 242 and normally holds them in closed position. As the members 33 are approaching the launching station, a wedge-shaped cam 298, which is secured by a bracket 299 to the brace 284, engages between a pair of cam rollers 300 on the respective travellers 242 and separates them. When the cam rollers 300 leave the rear edge of this cam 298, spoons 33 close upon the article in station X.

Another wedge-shaped cam 302, secured by a bracket 303 to the brace 285 causes the members 33 to open as they move along within the wrapper 18 so as to release the article therein.

*Loading the wrapped articles into continuously moving boxes at predetermined positions therein*

The machinery for loading the wrapped articles down into continuously moving boxes at predetermined positions therein is shown in FIGURES 3, 4, 20 and 21. The injector mechanism 40 includes a resilient trap door 44 comprising a plurality of triangular strips of rubber arranged in an annular pattern with their tips projecting inwardly toward the central vertical axis 39 of the mechanism and defining a small central hole 310. An annular frame 312 supports this trap door and also supports the resilient conical fingers 48. As seen most clearly in FIGURES 3 and 21, this annular frame 312 forms the lower end of a movable chassis 314 which includes a vertical plate 316 having two pairs of upper and lower eye guides 317 and 318 which are slidable up and down along a pair of parallel vertical slide rods 319 and 320. These slide rods are rigidly mounted upon a carriage 322 connected to a conveyor chain 323 which moves along an oblong circular path around a sprocket 324 on a vertical shaft 325 and a sprocket 326 on a parallel shaft 327. Each of these shafts 325 and 327 is supported by a pair of bearings above and below the sprocket, as shown in FIGURE 20, at 328 and 329, respectively, which are fastened to an upper and a lower deck 330 and 332, secured to two internal columns 334 and 336, and the whole machine is mounted upon pedestals 338 and 340.

In order to guide the carriages 322 there is an upper channel shaped track 342 extending around beneath the edge of the upper deck and a lower channel shaped track 344 extending around the edge of the lower deck 322. Each carriage includes four guide rollers 345 with vertical axes and four guide rollers 346 with horizontal axes. Two of the former run in the upper channel 342 and two of the latter engage the inner edge of the upper channel, which forms a guide rail. Similarly, two rollers 345 run in the lower channel and two rollers 346 engage the inner edge of the lower channel, which also forms a rail for supporting the carriage.

As shown in FIGURE 3, each of the four chassis 314 includes a bracket 347 projecting out from the plate 316 above the inserter mechanism 40 with a vertical strip 348 having a plunger guide slot 350 therein projecting up from the outer end of the bracket 347 parallel to the plunger rod 50. A compression spring 352 seating in a socket in the bracket 347 and surrounding the plunger rod beneath a collar 353 normally urges the plunger toward its raised position.

To control the vertical position of the plunger rod 50, a flat cam strip 354 encircles the machine, supported by braces 355. This cam strip engages a cam follower roller 356 held in the bifurcated upper end of the plunger rod 50 by an axle pin 357 which projects out into the plunger guide slot 350.

During the portion of the travel while the sweep arm 38 is removing the wrapped article from the dead plate 36, the cam strip 354 is elevated above its initial level 354–0 so as to provide adequate clearance for the wrapped article beneath the resilient concave plunger bumper 360. After the inserter mechanism has moved beyond the edge 42 of the dead plate, the cam strip 354 inclines down gradually along a segment 354–1 so as to depress the concave bumper 360 firmly against the top of the wrapped article. The inner ends of the rubber strips 44 begin to yield slightly downwardly forming a nest which holds the article against centrifugal force as the carriage 322 and its carriages 314 swing around the curve.

While swinging around the first curve the cam strip 354 remains at the same elevation as shown at 354–2, thus firmly holding the article. As the inserter mechanism begins moving along over the box 4, the cam strip inclines down a first slope 354–3 and finally down a steeper slope 354–4 followed by a horizontal dwell segment 354–5 and ending in an upward incline 354–6, which returns to the initial level 354–0, as seen at the left in FIGURE 21.

During the portion of the first downward travel 354–3 over the box, the inserter mechanism carriage 314 is depressed at the same rate as the plunger. In this way the inserter fingers 48 enter the box in the desired place in the box. Because the plunger is not yet fully depressed, the cupped chocolate has not yet been pushed down to the tips of the resilient fingers 48, as seen in FIGURE 21. Thus, the tips of the fingers 48 remain close together and can be inserted between the cupped chocolates which are already in the box. The final downward inclination 354–4 pushes the plunger down within the inserter mechanism to push the wrapped chocolate down to the tips of the fingers 48 in the box, as is shown in FIGURE 3.

For controlling the vertical position of the carriage 314, a channel cam 362 mounted on a top plate 363 engages a follower roller 364 attached to the upper end of the plate 316. Over the major portion of its total length the channel cam 362 is at the same elevation, but when it is over the box to be loaded, then the channel cam follows a downward inclination 362–1 which has the same slope as the segment 354–3 of the cam strip. The channel cam 362 has a lengthy horizontal dwell 362–2 during which the plunger places the cupped chocolate in the box as the plunger is driven downwardly by the steeper downward cam segment 354–4.

While the plunger dwells in its lowest position, held by the horizontal cam segment 354–5, the inserter fingers 48 commence their withdrawal controlled by the upwardly inclined segment 362–3 of the channel cam. The plunger remains at its lowest position until the resilient fingers 48 have been moved up to a position free of the wrapped article. This prevents the wrapped article from being picked up again accidentally from its proper place in the box.

In order to aid the sweep arm 38 in guiding the wrapped article into alignment with the opening 310 in the resilient trap door 44, an adjustable curved guide arm 402 (FIGURE 20) extends along beside the discharge end of the conveyor 24 and projects over the dead plate 36. This sweep arm is held by a clamp screw 404 and can be swung so as to adjust the position of its tip 406 with respect to the path of travel of the concave surface 408 (FIGURE 4A) of the sweep arm 38. Moreover, the position of the sweep arm itself can be adjusted with respect to the axis 39 of the opening 310, as is indicated by the adjusting slots 410 in FIGURE 4A. In this way, various sizes and shapes of cupped chocolates are accommodated.

A thin smooth leaf 412 of spring steel extends somewhat beyond the edge 42 of the dead plate 36 and forms a ramp for gently sliding the wrapped article down onto the resilient trap door 44 as the inserter mechanism 40 moves away from the dead plate.

During the setting up of the system and during adjustment for loading different types of boxes, the operator may wish to run the main conveyor 2 and also to run one or more of the machines 20 while preventing the inserter mechanisms 40 from descending into the boxes 4. In this way the inserter mechanisms move along over the boxes, and the operator can see the respective places in each box into which they will descend when actuated to do so.

To prevent the inserter mechanisms 40 from descending into the boxes, the operator merely swings a handle 414 (FIGURE 23) up away from a stop 416 into contact with a second stop 418. As shown in FIGURE 22, this handle 414 is secured to the center of a shaft 420 which has a pair of elevator cams 421 and 422 fastened thereto. These cams ride on bearing plates 423 and 424, respectively, mounted on a pair of brackets 425 projecting above the top plate 363. A horizontal brace 426 spans between these brackets for supporting a pair of slide bearings 427 and 428 through which pass a pair of elevator rods 429 and 430. These rods are fastened to loose sleeves 431 and 432 on the shaft 420.

When the handle is swung up against the stop 418, the cams 421 and 422 raise the shaft 420 and thus pull the rods 429 and 430 upwardly. The lower ends of these rods are connected to the top 433 of an elevator frame 434 on which are mounted those portions of the cam strip 354 and those portions of the rail 362 which serve to lower the inserter mechanism 40 into the boxes. Consequently, by raising the elevator frame 434 the inserter mechanism is prevented from descending into the boxes.

During normal operation, as shown in FIGURE 3, the roller 364 at the upper end of the chassis plate 316 is supported by the rail 362 and travels down along the depressed rail portions 362–1, 362–2, and 362–3. There is an alternative roller 364A secured to the outside of the plate 316 and normally passing freely above an alternative rail portion 362A which extends along the bottom of the elevator frame 434. When this elevator 434 is raised to its upper position U, the alternative rail 362A rises up beneath the roller 364A so as to support the carriage 314 and prevent it from lowering down as far as it normally does.

The portions of the depresser cam 354 which extend between the points A and B in FIGURE 22 are mounted upon the elevator frame 434 and are moved up by the elevator frame. Normally, an auxiliary cam follower roller 356A engages these portions of the cam strip so as to depress the plunger fully. However, when the elevator frame 434 is raised, then the roller 356 merely rides up against a continuing portion of the cam strip 354 held by a bracket 436.

A removable cover 366 extends over the top and sides of the machine 37, being secured to the top plate 363 by a series of support posts 368 and including an access opening for the handle 414.

The various individual machines 20 are each driven as satellites of the main conveyor 2. As shown in FIGURE 1A, each machine 20 includes its own three-phase synchronous motor 438 and gear reduction drive 440 secured to a sprocket 441 for driving the chain 151. The main conveyor 2 is also driven by a three-phase synchronous motor, as will be understood. Accordingly, all of the satellite machines 20 and the main conveyor 2 operate in synchronism being effectively locked into synchronism by the three-phase electrical power mains in the building where the system is installed.

As a result, the over-all system is extremely flexible in operation. Additional machines 20 can readily be added along the main conveyor line by wheeling them into place on their wheels 370 and 372 and then anchoring them in place by suitable removable fastenings 374 and 376. For example, the operator may wish to pack more wrapped articles into larger boxes, and thus he conveniently adds further satellite machines 20. Alternatively, at any time one or more of the machines 20 can be removed, without disturbing the over-all operation of the system. Each satellite machine wraps and places an article at a desired position in each box as it comes along the main conveyor.

In order precisely to establish the position within the box 4 in a direction longitudinally of the main conveyor at which the wrapped article is loaded, the operator adjusts the position of the machine 20 along the conveyor 2 before anchoring it to the floor. Also, the operator may adjust the operation of the machine 37 with respect to the main conveyor belt. For example, this may be accomplished by adjusting the angular position of the drive shaft 326 with respect to the bevel gear mechanism 263 which is secured to the vertical shaft 327.

To determine the position within the box 4 laterally of the main conveyor at which the wrapped article is loaded, the whole machine 37 is adjusted in position by moving its pedestals 338 and 340 closer to or farther away from the edge of the main conveyor. To accommodate this motion of the machinery 37 while enabling the remainder of the machine to remain stationary, the position of the discharge roller of the conveyor 24 can conveniently be moved by loosening the screws 384 as required to meet the edge of the dead plate 36, as indicated in FIGURE 2 by the dashed outline 388'. The conveyor belt 134 is maintained in tension by adjusting the position of the tension roll 146 by loosening the screws 390 and 392 and adjusting the position of the slotted bracket 394, and the slot 396 in the side of the main frame 398 accommodates the adjustment of the shaft 400 of the roller 146. It will be noted that FIGURE 2 shows the box loading machinery 37 of the various machines in slightly different positions with respect to the width of the conveyor for loading different points in the box.

In the event that the box has two layers of chocolates, then the system loads the first layer, and a horizontal cardboard or stiff paper separator is inserted. This separator then serves as the floor upon which is loaded the upper layer of chocolates. It will be appreciated that the extra height of the upper level of the box should be accommodated with respect to the movement of the injector mechanism 40 and plunger 50. This may conveniently be done by lowering slightly the level of the second half of the main conveyor by an amount equal to the distance from the floor of the box to the upper surface of the separator. Alternatively, the level of the machines 20 can be raised by this amount along the second half of the main conveyor.

From the foregoing it will be understood that the packaging system, machinery, and apparatus embodying the present invention as described above are well suited to provide the advantages set forth, and since many possible embodiments may be made of the various features of this invention and as the machinery and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. A system for wrapping articles and for loading the wrapped articles into boxes comprising a main conveyor adapted to carry the boxes to be loaded, a wrapper conveyor for transporting the wrappers, drive mechanism for moving continuously said wrapper conveyor and said main conveyor, wrapper dispensing apparatus adapted to place the wrappers upon said wrapper conveyor at spaced intervals while said wrapper conveyor continues to move, article supplying mechanism for releasing the articles at timed intervals in synchronism with the movement of said spaced wrappers, wrapper loading mechanism receiving the articles from said supplying mechanism and placing the articles into said wrappers as said wrappers move along said wrapper conveyor, box loading apparatus positioned near said main conveyor and having a movable inserter mechanism travelling along a closed path including a portion which is above a box on said main conveyor, said inserter mechanism receiving a wrapped article from said wrapper conveyor, said box loading apparatus including control means for lowering said insert mechanism into a box while said inserter mechanism is moving along said portion of its path in synchronized relationship with the box for loading the wrapped article therein in a predetermined position within the box.

2. A system for automatically putting chocolates into crinkle cups and for loading the cupped chocolates into boxes comprising a main conveyor adapted to carry the boxes to be loaded, a cup conveyor for transporting the crinkle cups, drive mechanism for moving said cup conveyor at a constant rate with respect to the movement of the main conveyor, cup dispensing apparatus adapted to place the cups upon said cup conveyor at uniformly spaced intervals, supplying mechanism for releasing the chocolates one at a time in synchronism with the movement of the cups along said cup conveyor, cup loading mechanism receiving the chocolates from said supplying mechanism and placing them into said cups as said cups continue to move along said cup conveyor, box loading apparatus positioned near said main conveyor and having a movable injector mechanism travelling along a closed path including a portion which is above a box on said conveyor, said injector mechanism receiving a cupped chocolate from said cup conveyor at another portion of its path, said box loading apparatus including control means for lowering said injector mechanism into a box while said injector mechanism is moving along said portion of its path in synchronized relationship with the box for loading the cupped chlocolate therein in a predetermined position within the box.

3. A machine for loading articles into cup-shaped wrappers, comprising mechanism for bringing the articles to a predetermined launching station wherein opposite sides of the articles are accessible, a plurality of opposed grasping members, drive means connected to said grasping members and arranged to move said grasping members along a first path, at one portion of said path said grasping members passing along on opposite sides of the launching station, closure means acting upon said grasping members when they are in said portion of their path and adapted to close said grasping members against opposite sides of articles in said launching station, conveyor means for carrying the cup-shaped wrappers along a second path converging toward said first path, said grasping members entering one of the wrappers in said second path, and opening means acting upon said grasping members for releasing articles into the wrapper after entry of the grasping members therein, said first and second paths diverging after the articles have been released for withdrawing the grasping members from the wrapper.

4. A system for placing confections into wrapper cups and for loading the cupped confections into boxes comprising a main conveyor adapted to carry the boxes to be loaded along a predetermined path with at least one side of the boxes being open and facing upwardly, a wrapper conveyor for transporting the wrapper cups, drive mechanism for moving continuously said main conveyor and said wrapper conveyor, wrapper dispensing apparatus for engaging the wrapper cups at timed intervals with said moving wrapper conveyor, confection supplying mechanism for releasing the confections at timed intervals in synchronism with the movement of said wrapper cups along said wrapper conveyor, wrapper loading mechanism receiving the confections from said supplying mechanism and placing the confections down into said cup wrappers as said cup wrappers move along said wrapper conveyor, box loading apparatus positioned near said main conveyor and having a movable inserter mechanism travelling along an oblong closed path including a rectilinear portion which is above and parallel with said main conveyor, said inserter mechanism receiving a cupped confection at timed intervals from said wrapper conveyor, said box loading apparatus including control means for lowering said inserter mechanism into a box while said inserter mechanism is moving along said rectilinear portion of its path in synchronized relationship with a box moving along said main conveyor for loading the cupped confection in a predetermined position into the box.

5. A system for placing confections into wrapper cups and for loading the cupped confections into boxes comprising a main conveyor adapted to carry the boxes to be loaded along a predetermined path with at least one side of the boxes being open, a wrapper conveyor for transporting the wrapper cups, drive mechanism for moving continuously said main conveyor and said wrapper conveyor, wrapper dispensing apparatus for introducing the wrapper cups at timed intervals onto said moving wrapper conveyor, confection supplying mechanism for supplying the confections at timed intervals in synchronism with the movement of said cups along said wrapper conveyor, wrapper loading mechanism receiving the confections from said supplying mechanism and placing the confections down into said cups as said cups move along said wrapper conveyor, and the wrapper conveyor delivering the cupped confections one at a time to a predetermined position, box loading apparatus positioned near said main conveyor and having a movable inserter mechanism moving repeatedly around an oblong closed path including a first rectilinear portion adjacent to said predetermined position and a second rectilinear portion adjacent to and parallel with said main conveyor, said inserter mechanism removing a cupped confection at timed intervals from said predetermined position, said box loading apparatus including control means for moving said inserter mechanism into a box while said inserter mechanism is moving along said second rectilinear portion of its path in synchronized relationship with a box moving along said main conveyor for loading the cupped confection in a predetermined position into the box.

6. Apparatus for placing confections in wrapper cups comprising a magazine for holding a supply of wrapper cups in inverted position, said magazine having a downwardly opening discharge mouth with stop means adapted to retain the cups in the magazine, a hollow plunger communicating with a vacuum source and having a suction head, cyclically operating drive means connected to said plunger and adapted to reciprocate said plunger up and down while swinging said suction head to invert said plunger, said suction head entering the bottom of the magazine through said discharge mouth on the upstroke for removing the bottom cup therefrom, and said suction head on the downstroke delivering the cup into an upright position, a vacuum conveyor for carrying said cups comprising a continuously moving belt having uniformly spaced holes therein communicating with an elongated suction housing beneath said belt, an enclosed chamber having a length less than the spacing between said holes and having an open bottom adjacent to the upper surface of the belt, said holes passing beneath said chamber one at a time from a first side to a second side of the chamber, said second side of the chamber having an opening therein adjacent to the upright position of the cup as delivered by the suction head, said chamber retaining the upright cup until the next advancing suction hole arrives beneath the cup and then releasing the cup upon loss of vacuum within the chamber as the suction hole exits from beneath the chamber, and cup loading mechanism driven in synchronized relationship with the movement of the suction holes positioning the confections in said cups as said cups move along on the vacuum conveyor.

7. Apparatus for placing confectionary articles into cup-shaped wrappers comprising conveyor means for moving said wrappers in sequence along a predetermined path, delivery mechanism for delivering the confectionary articles to a point at which the sides of the confectionary articles are exposed, a plurality of opposed grasping members, and actuating mechanism for closing said members against opposite sides of a confectionary article at said point and for carrying the confectionary article into a position adjacent to a wrapper in said path, said grasping members having tip portions with outer surfaces diverging outwardly in a direction away from the tip portions providing diverging guide surfaces for entering and spreading the mouth of the wrapper, said actuating mechanism bringing the tip portions of said grasping members into the wrapper and thereafter opening said grasping members for releasing the confectionary article in the wrapper.

8. Apparatus for placing confectionary articles into cup-shaped wrappers comprising conveyor means for moving said wrappers in sequence along a predetermined path, delivery mechanism for delivering the confectionary articles to a point at which the sides of the confectionary articles are exposed, a plurality of opposed grasping members having resilient inner surfaces, and actuating mechanism for closing said members with said resilient surfaces pressing gently against opposite sides of a confectionary article grasped by said resilient surfaces into a position adjacent to a wrapper in said path, said grasping members having tip portions with outer surfaces diverging outwardly in a direction away from the tip portions providing effectively a wedge-shaped outline for entering and spreading the mouth of the wrapper, said actuating mechanism bringing the tip portions of said grasping members into the wrapper and thereafter opening said grasping members for releasing the confectionary article in the wrapper.

9. Apparatus for placing confectionary articles into cup-shaped wrappers comprising conveyor means for moving said wrappers in sequence along a predetermined path, delivery mechanism for delivering the confectionary articles to a station in which the sides of the confectionary articles are exposed, a pair of opposed spoon-shaped grasped members having their tips pointing downwardly with their concave surfaces facing each other, and actuating mechanism for closing said spoon-shaped members against opposite sides of a confectionary article therebetween in said station and for carrying the confectionary article into a position adjacent to a wrapper in said path, the downwardly pointing tips of said spoon-shaped members providing an effective wedge pointing downwardly beneath the article for entering and spreading the mouth of the wrapper, said actuating mechanism bringing the tips of said spoon-shaped members into the wrapper and thereafter opening said members for releasing the confectionary article in the wrapper.

10. Apparatus for placing confectionary articles into cup-shaped wrappers as said wrappers are in continuous movement comprising first conveyor means for moving a plurality of said wrappers in sequence along a predetermined path, drive mechanism connected to said first conveyor means for continuously moving said wrappers along said path, second conveyor means for moving the confectionary articles along a second predetermined path with opposed sides of the confectionary articles in said second path being exposed, a plurality of opposed grasping members adapted to engage the exposed sides of a confectionary article moving along said second path, and actuating mechanism for said members for grasping said members about the article and for carrying the article into a position adjacent to one of the wrappers in said path, said members having tip portions with outer surfaces diverging outwardly in a direction away from the tip portions for entering and spreading the wrapper, said actuating mechanism thereafter releasing the article into the wrapper and withdrawing said members.

11. Apparatus for placing confectionary articles into wrappers as claimed in claim 10 and wherein said second conveyor means includes a continuously moving belt which is narrower than said articles and which is adapted to slide beneath said articles without damaging them, supply mechanism for supplying the articles to said belt, and an escapement mechanism positioned between said supply mechanism and said second path and operating in timed relationship with the movement of said grasping members, said escapement mechanism intermittently releasing the articles for movement along said second path.

12. Apparatus for placing confectionary articles into wrappers as claimed in claim 11 and wherein said escapement mechanism includes a removable barrier for intermittently releasing the leading one of the confectionary articles on said moving belt and restraining apparatus for restraining all of the other confectionary articles on said moving belt when the leading one is released.

13. Apparatus for placing confectionary articles into cup-shaped wrappers as said wrappers are in continuous movement comprising first conveyor means for moving a plurality of said wrappers in sequence along a predetermined path, drive mechanism connected to said first conveyor means for continuously moving said wrappers along said path, second conveyor means for moving the confectionary articles along a second predetermined path with opposed sides of the confectionary articles in said second path being exposed, a plurality of opposed grasping members adapted to engage the exposed sides of a confectionary article moving along said second path, a movable carriage carrying said grasping members, third conveyor means for moving said carriage near said second path, actuating means associated with said movable carriage for grasping said members about the article, said first and third conveyor means converging for carrying the article into a position adjacent to one of the wrappers in said path and for introducing said members into the wrapper, said actuating mechanism thereafter releasing the article into the wrapper and said first and third conveyor means diverging for withdrawing said members from the wrapper.

14. Apparatus for placing confectionary articles into cup-shaped wrappers as claimed in claim 13 including guide means for said movable carriage for maintaining said carriage at a predetermined attitude with respect to said first conveyor means while said grasping members are introduced into and withdrawn from the wrapper.

15. Apparatus for placing confectionary articles into cup-shaped wrappers as claimed in claim 13, and wherein there are a pair of said opposed grasping members carried by said carriage, said pair of grasping members being mounted upon respective ones of a pair of movable slides on said carriage, and spring means urging said slides towards one another.

16. Apparatus for placing confectionary articles into cup-shaped wrappers as said wrappers are in continuous movement comprising first conveyor means for moving a plurality of said wrappers in sequence along a first predetermined path, drive mechanism connected to said first conveyor means for continuously moving said wrappers along said path, second conveyor means for moving the confectionary articles along a second predetermined path with opposed sides of the confectionary articles in said second path being exposed, a plurality of opposed grasping members adapted to engage the exposed sides of a confectionary article moving along said second path, cam follower means for actuating said grasping members, a movable carriage carrying said grasping members and cam follower means, third conveyor means for moving said carriage along a third path passing near said second path, control cam means extending along said third path and coacting with said cam follower means for grasping said members about the article, said first and third paths converging for carrying the article into a position adjacent to one of the wrappers and for introducing said members into the wrapper, said cam means again coacting with said cam follower means for releasing the article into the wrapper and said first and third paths diverging for withdrawing said members from the wrapper.

17. Apparatus for placing confectionary articles into wrappers as claimed in claim 16 and wherein said control cam means are fixed and said carriage is in continuous movement for moving said control cam follower means along said cam means, whereby said grasping members are maintained in continuous movement and are actuated sequentially into grasping and releasing operation.

18. Apparatus for placing confectionary articles into cup-shaped wrappers as said wrappers are in continuous movement comprising first conveyor means for moving a plurality of said wrappers in sequence along a predetermined path, drive mechanism connected to said first conveyor means for continuously moving said wrappers along said path, second conveyor means for moving the confectionary articles along a second predetermined path with opposed sides of the confectionary articles in said second path being exposed, a movable carriage, third conveyor means for moving said carriage along a third path having a portion which is near to and substantially parallel with said second path, a pair of opposed grasping members movably mounted on said carriage to permit movement in a direction substantially transverse to said portion of the third path, spring means urging said members towards each other, first actuating means near said portion of the third path for grasping said members about the article, said first and third paths converging for carrying the article into a position adjacent to one of the wrappers in said path, said third path having a second portion which is near to and substantially parallel with said third path for introducing said members into the wrapper, and second actuating mechanism near said second portion of the third path for releasing the article into the wrapper and said first and third paths diverging for withdrawing said members from the wrapper.

19. Apparatus for placing confectionary articles into cup-shaped wrappers as claimed in claim 18 and wherein said first and second actuating means comprise elongated cams extending along the respective portions of said third path, said carriage including cam follower means adapted to engage said elongated cams for controlling said grasping members.

20. A system for placing confectionary articles into boxes comprising main conveyor means for conveying the boxes in sequence along a predetermined path with the tops of the boxes being open, main drive means connected to said main conveyor for continuously moving said boxes in sequence along said path, a plurality of substantially identical machines positioned at spaced points along the length of said conveyor means for placing the articles down into the respective boxes along said path, each of said machines being operated in timed relationship with respect to the movement of the boxes along said path and each of said machines including a moving carriage having a plurality of downwardly converging guide fingers, means for moving the respective carriages over said boxes at a slightly different position with respect to the boxes for positioning the various confectionary articles down into the boxes at different predetermined points in the boxes, means for supplying the confectionary articles to said carriages, means for positioning the lower ends of said guide fingers into the boxes at said points and then for removing them therefrom, and means for moving the confectionary articles down between said guide fingers and for holding them in position in the boxes while the guide fingers are removed from the box.

21. A system for placing wrapped confectionary articles into boxes comprising main conveyor means for conveying the boxes in sequence along a predetermined path with the tops of the boxes being opened, main drive means connected to said conveyor means for moving said boxes along said path, a plurality of vertical inserter mechanisms positioned at spaced points along said path, each of said inserter mechanisms including a moving carriage adapted for movement substantially synchronized with the movement of a box along a respective portion of said path, each of said carriages including a plurality of downwardly converging guide fingers and plunger means for forcing a wrapped confectionary article down among said converging guide fingers, and operating means for moving said guide fingers down into a box during movement of the box along a respective portion of said path, said operating means in sequence actuating said plunger means for forcing a wrapped confectionary article down into the box among said guide fingers and then withdrawing said guide fingers while said plunger means holds the wrapped article in the box, and finally withdrawing said plunger means.

22. A system for placing wrapped confectionary articles into boxes as claimed in claim 21 and wherein the operating means in each of said vertical inserter mechanisms includes first and second tracks for controlling the upward and downward movements of said guide fingers and of said plunger means, said first track including downwardly and upwardly inclined portions for moving said guide fingers into a box and for withdrawing said guide fingers, and said second track including downwardly and upwardly inclined portions positioned after the respective portions of said first track.

23. A system for placing wrapped confectionary articles into boxes comprising main conveyor means for conveying the boxes in sequence along a predetermined path with the tops of the boxes being opened, main drive means connected to said conveyor means for moving said boxes along said path, a plurality of vertical inserter mechanisms positioned at spaced points along said path, each of said inserter mechanisms including a moving carriage adapted for movement substantially synchronized with the movement of a box along a respective portion of said path, each of said carriages including a first plurality of guide fingers having tips converging downwardly about an axis and defining a substantially conical configuration, a second plurality of guide fingers within said conical configuration converging downwardly about said axis, and plunger means for forcing a wrapped confectionary article down among said converging guide fingers, and operating means for moving the tips of said first plurality of guide fingers down into a box during movement of the box along a respective portion of said path, said operating means actuating said plunger means for forcing a wrapped confectionary article down into the box through said second and first plurality of guide fingers.

24. Apparatus for placing confections in cup-shaped wrappers having outwardly and upwardly flaring fluted walls comprising a magazine for holding a supply of wrappers in inverted position, said magazine having a downwardly opening discharge mouth with stop means adapted to retain the wrappers in the magazine, a hollow plunger communicating with a vacuum source and having a suction head, cylically operating drive means connected to said plunger and adapted to reciprocate said plunger up and down and swinging said suction head to invert said plunger, said suction head entering the bottom of the magazine through said discharge mouth on the upstroke for removing the bottom wrapper therefrom, and said suction head on the downstroke delivering the wrapper into an upright position, wrapper removing means defining an opening having a width less than the normal diameter across the wrapper between the upper edges of said flaring walls into which the wrapper is depressed at the lower limit of said downstroke, said wrapper removing means engaging the upper edges of said flaring walls for retaining the wrapper upon the upstroke of said suction head, a continuously moving wrapper conveyor for moving the individual upright wrapper out of said wrapper removing means, and wrapper loading mechanism for placing the confections in the wrappers.

25. A machine for placing confectionary articles into containers at predetermined positions within the containers comprising means for supplying a sequence of containers to be loaded, a plurality of inserter mechanisms each having a passageway extending downwardly therethrough and each having a plurality of downwardly converging guide fingers projecting downwardly about said passageway, means for positioning the lower ends of said fingers into predetermined positions in containers of the sequence and subsequently for withdrawing the fingers from said containers, confectionary delivery means for delivering the confectionary articles to said passageways, confectionary lowering means for lowering the confectionary articles down along said passageway through said guide fingers into the predetermined positions in the containers and for holding the confections down in position in the containers while said guide fingers are withdrawn from said containers, and means for moving said confectionary lowering means out of contact with the confections after said guide fingers have been withdrawn.

26. Apparatus for automatically loading confectionary articles into boxes among a plurality of confectionary articles already existing in the box comprising an inserter mechanism having an opening therein and a plurality of guide elements positioned about said opening and converging downwardly below said opening, supply means for supplying the confectionary articles into position over said opening, resilient trap door means normally blocking said opening for supporting the article over said opening and including a plurality of displaceable resilient elements extending inwardly toward the center of said opening, movable support means for moving the boxes into relative position below said downwardly converging guide elements, drive means for inserting said converging guide elements into a box among the existing confectionary articles already therein, and loading mechanism for moving a confectionary article down through said opening while displacing said resilient elements of the trap door means and moving the article down through said guide elements while spreading the lower portions of said guide elements for accommodating the passage of the confectionary article therethrough and for opening up a suitable space among the existing confectionary articles for receiving the confectionary article being loaded therein.

27. A system for placing confections into containers comprising main supply means for supplying the containers with the tops of the containers being open, a plurality of inserter mechanisms for placing the confections into said containers, each of said inserter mechanisms including a moving carriage having a passageway extending down through the carriage and a plurality of guide elements projecting downwardly from the carriage and converging downwardly around said passageway, confection supply means for supplying the confections to a predetermined location with respect to the moving carriage, each carriage having a concave sweep arm thereon with a concave configuration for sweeping the confection from said location into alignment with said passageway, curved guide means adjacent to said location for guiding the confection into the concave sweep arm, plunger means for moving the confection down along said passageway among said guide elements, and operating means for moving said guide elements down into a container and for actuating said plunger means for moving the confection down said passageway into the container.

References Cited by the Examiner
UNITED STATES PATENTS

| | | | |
|---|---|---|---|
| 1,886,122 | 11/32 | Rose | 53—250 |
| 2,277,688 | 3/42 | Cattonar et al. | 53—248 X |
| 2,505,384 | 4/50 | Burstiner | 99—180 |
| 2,523,517 | 9/50 | Potter. | |
| 2,540,743 | 2/51 | Leach | 53—248 X |
| 2,558,028 | 6/51 | Winters | 53—238 X |
| 2,598,137 | 5/52 | Schultz et al. | 99—180 |
| 2,653,743 | 9/53 | Stenger | 53—250 |
| 2,877,614 | 3/59 | Currivan | 53—240 |
| 2,886,927 | 5/59 | Fisk | 53—251 X |
| 2,976,659 | 3/61 | Flanagan et al. | 53—251 X |
| 3,018,595 | 1/62 | Harris et al. | 53—78 |
| 3,049,215 | 8/62 | Hunter et al. | 198—30 |
| 3,051,291 | 8/62 | Hennessey | 198—30 |

FRANK E. BAILEY, *Primary Examiner.*

ROBERT A. LEIGHEY, *Examiner.*